(12) United States Patent
Araki et al.

(10) Patent No.: US 7,904,763 B2
(45) Date of Patent: Mar. 8, 2011

(54) RECEPTION DEVICE, RECEPTION METHOD, INFORMATION PROCESSING DEVICE, INFORMATION PROCESSING METHOD, AND PROGRAM

(75) Inventors: Ryosuke Araki, Tokyo (JP); Masato Kikuchi, Tokyo (JP); Shunsuke Mochizuki, Tokyo (JP); Masahiro Yoshioka, Tokyo (JP); Masaki Handa, Kanagawa (JP); Takashi Nakanishi, Tokyo (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 239 days.

(21) Appl. No.: 12/208,466

(22) Filed: Sep. 11, 2008

(65) Prior Publication Data

US 2009/0100301 A1 Apr. 16, 2009

(30) Foreign Application Priority Data

Oct. 10, 2007 (JP) ................................ 2007-264029

(51) Int. Cl.
*G06F 11/00* (2006.01)
*G08C 25/00* (2006.01)

(52) U.S. Cl. ............... 714/704; 714/2; 714/48; 714/746; 714/789; 714/818; 714/798; 714/708; 375/224; 375/226; 455/103; 455/67.14; 455/115.2; 455/423; 455/63.1; 455/69; 360/46

(58) Field of Classification Search ........................ None
See application file for complete search history.

(56) References Cited

U.S. PATENT DOCUMENTS

| | | | | |
|---|---|---|---|---|
| 6,148,423 A * | 11/2000 | Le Mouel et al. | ............. | 714/708 |
| 6,397,369 B1 * | 5/2002 | Despain et al. | ............... | 714/798 |
| 7,373,431 B2 * | 5/2008 | Kondo | .............. | 710/2 |
| 2004/0107391 A1 * | 6/2004 | Bauman | ........................ | 714/704 |
| 2006/0084406 A1 * | 4/2006 | Strachan et al. | ............. | 455/334 |
| 2007/0178847 A1 * | 8/2007 | Nakagawa | ...................... | 455/69 |

FOREIGN PATENT DOCUMENTS

| | | |
|---|---|---|
| JP | 6-338914 | 12/1994 |
| JP | 2003-179821 | 6/2003 |

* cited by examiner

*Primary Examiner* — John P Trimmings
(74) *Attorney, Agent, or Firm* — Oblon, Spivak, McClelland, Maier & Neustadt, L.L.P.

(57) ABSTRACT

A reception device configured to receive a signal of a transmitted bit string transmitted from a transmission device which transmits a bit string includes: a receiving unit arranged to receive a signal from the transmission device and output a received bit string corresponding to the transmitted bit string; a storing unit arranged to store an error rate table wherein said received bit string is correlated with an error rate of post-data which is data of one bit or greater received following the received bit string being in error; and an error correcting unit arranged to perform error correcting of the post-data of the received bit string.

20 Claims, 18 Drawing Sheets

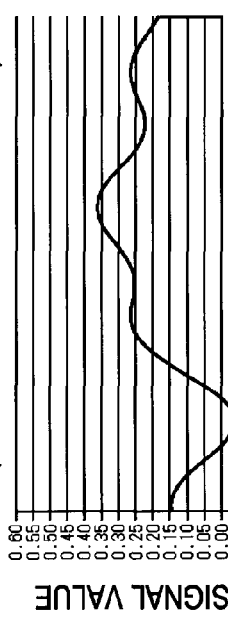
FIG. 5A
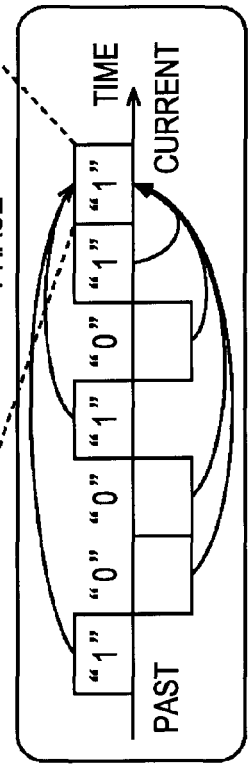
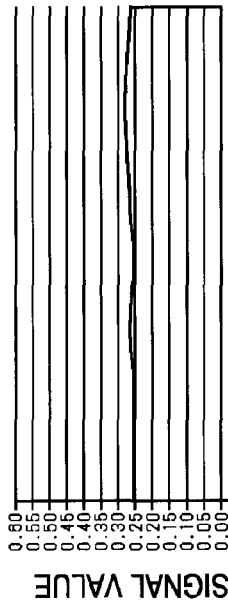
FIG. 5B
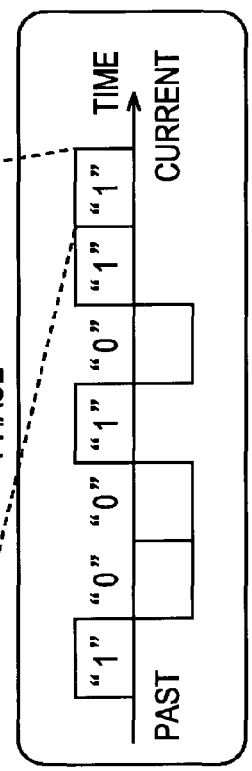

RECEPTION DEVICE, RECEPTION METHOD, INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2007-264029 filed in the Japanese Patent Office on Oct. 10, 2007, the entire contents of which are incorporated herein by reference.

BACKGROUND OF THE INVENTION

1. Field of the Invention

The present invention relates to a reception device, reception method, information processing device, information processing method, and program, and particularly relates to a reception device, reception method, information processing device, information processing method, and program arranged to readily correct routine errors occurring on a multi-bus or the like, for example.

2. Description of the Related Art

Heretofore, for example, there are signal processing devices which supply an image signal to a display device such as a CRT (Cathode Ray Tube) or LCD (Liquid Crystal Display) by performing signal processing on an image signal from a tuner receiving a television broadcast signal or an external device such as a DVD (Digital Versatile Disc) player, for example.

With such a signal processing device, signal processing is performed, such as noise removal processing to remove noise from the signal of the image supplied from the external device, image converting processing to convert the image signal so that the image displayed on a display device is of higher image quality than the image from the external device, image adjusting processing to adjust the brightness or contrast of the image displayed on the display device, and so forth.

FIG. 1 is a block diagram illustrating a configuration of an example of a signal processing device according to the related art. In FIG. 1, a signal processing device 11 is made up of a casing 12, connectors $13_1$ through $13_4$, input selector 14, signal router 15, connectors $16_1$ through $16_4$, connectors $17_1$ through $17_3$, function blocks $18_1$ through $18_3$, connector 19, remote commander 20, operating unit 21, system control block 22, control bus 23, and so forth.

With the signal processing device 11, the connectors $13_1$ through $13_4$ are connected to the input selector 14 via a signal cable, and the input selector 14 is connected to the signal router 15 via a signal cable. Also, the signal router 15 is connected to the connectors $16_1$ through $16_4$ and connector 19 via a signal cable, and is further connected to the function blocks $18_1$ through $18_3$ via the connectors $16_1$ through $16_4$ and connectors $17_1$ through $17_3$. Also, the input selector 14, signal router 15, connectors $16_1$ through $16_4$, and system control block 22 are mutually connected via the control bus 23.

The casing 12 is a metallic casing in a rectangular parallelepiped shape, for example, and therein are stored the input selector 14, signal router 15, connectors $16_1$ through $16_4$, connectors $17_1$ through $17_3$, function blocks $18_1$ through $18_3$, system control block 22, and control bus 23.

Also, the casing 12 is provided such that the connectors $13_1$ through $13_4$ and 19 and operating unit 21 are exposed externally. The connectors $13_1$ through $13_4$ are connected to a cable which connect the signal processing device 11 and external devices (not shown) such as a tuner or DVD player which supply image signals to the signal processing device 11.

Image signals from the external devices are supplied to the input selector 14 via the connectors $13_1$ through $13_4$. In accordance with control from the system control block 22, the input selector 14 selects the image signal supplied from the connectors $13_1$ through $13_4$, and supplies this to the signal router 15.

In accordance with control from the system control block 22, the signal router 15 supplies the signal supplied from the input selector 14 to a function block $18_i$ via connectors $16_i$ and $17_i$ (in FIG. 1, i=1, 2, 3).

Also, a signal subjected to signal processing is supplied from a function block $18_i$ to the signal router 15 via connectors $16_i$ and $17_i$. The signal router 15 supplies the signal from the function block $18_i$ to a display device (not shown) connected to the connector 19 via the connector 19.

The connectors $16_i$ and $17_i$ are mutually detatchable, and connect the signal router 15 and the control buses 23 each with the function blocks $18_i$. Note that in FIG. 1, four connectors $16_1$ through $16_4$ are provided within the casing 12, and of these, three connectors $16_1$ through $16_3$ are each connected to the connectors $17_1$ through $17_3$ of the function blocks $18_1$ through $18_3$. In FIG. 1, the connector $16_4$ which is not connected to anything can be connected to a (connector of a) new function block added to the signal processing device 11.

The function block function blocks $18_1$ through $18_3$ each have a signal processing circuit which performs signal processing such as noise removal processing, image converting processing, image adjusting processing, or the like. The function blocks $18_1$ through $18_3$ perform signal processing as to a signal supplied from the signal router 15, and supplies the signal subjected to signal processing to the signal router 15.

The connector 19 is connected to a cable which connects the signal processing device 11 and a display device which displays an image output from the signal processing device 11. The remote commander 20 has multiple buttons and so forth which are operated by a user, and supplies (transmits) an operation signal according to a user operation when operated by the user to the system control block 22 employing infrared light or the like. The operating unit 21 has multiple buttons which are operated by a user, and supplies an operating signal according to a user operation when operated by the user to the system control block 22, similar to the remote commander 20.

Upon the operation signal according to the user operation being supplied from the remote commander 20 or operating unit 21, the system control block 22 controls the input selector 14, signal router 15, or function blocks $18_1$ through $18_3$ via the control bus 23, such that the processing according to the operation signal is performed.

With the signal processing device 11 thus configured, an image signal is supplied to the signal router 15 via the connectors $13_1$ through $13_4$ and input selector 14, and an image signal is transmitted (sent) via the signal cable between the signal router 15 and function blocks $18_1$ through $18_3$.

SUMMARY OF THE INVENTION

Now, in recent years there has been a trend for increased capacity of the image signal for the signal processing device 11 to subject to signal process, along with greater image resolution. When the capacity of the image signal becomes great, for example, the image signal is transmitted at high speed between the signal router 15 and function blocks $18_1$ through $18_3$ via a signal cable. Thus, when a signal is transmitted at high speed, problems can occur with signal transmissions from the effects of signal cable frequency features, crosstalk, and shifting of timing (skewing) which occurs in parallel signal cables.

Thus, there is a method to perform signal transmission with wireless communication. Now, for wireless communication, there is proximity non-contact communication employed with IC (Integrated Circuit) tags and so forth, which transmits a signal using electromagnetic conducting, and wireless communication and so forth which uses radio waves.

In order to perform proximity non-contact communication, the transmission side and the reception side are preferably disposed in a somewhat near state, and accordingly, by performing proximity non-contact communication between the boards of the signal processing device, the positions and so forth of the boards are restricted.

Wireless communication using radio waves is not thus restricted. For example, a signal processing device which performs signal processing with boards built into the casing transmitting signals back and forth with wireless communication using radio waves is disclosed in Japanese Unexamined Patent Application Publication No. 2003-179821.

As described in Japanese Unexamined Patent Application Publication No. 2003-179821, for example the signal router 15 and function blocks 18$_1$ through 18$_3$ transmit a signal with wireless communication using radio waves, thereby avoiding the problems which occur by transmitting a signal via a signal cable at high speed.

However, when the signal router 15 and function blocks 18$_1$ through 18$_3$ transmit a signal with wireless communication using radio waves within the casing 12 of the signal processing device 11, the radio waves may reflect off the wall face of the casing 12, or the radio waves may diffract at the boards built into the casing 12, whereby multiple transmission paths (multipath) having distances which are difference from that of the transmission path (path) are created. Upon such multipath occurring, multiple signals with shifted phases arrive at the receiving side that receives the signal, the multiple signals interfere with one another (multipath phasing occurs), and error occurs in the bit (bit string) reproduced at the receiving side.

That is to say, according to multipath phasing, the signal of the bit transmitted last receives influence from the signal of the bit transmitted beforehand (in the past), and as a result, the waveform of the signal of the bit transmitted last can be deformed, whereby an error can occur on the bit reproduced on the receiving side.

Also, other than wireless communication within the casing, for example, the phase of a signal can shift with a multipath occurring by radio waves reflecting off of a structure such as a high-rise building, from moving communication from a portable telephone, whereby interference can occur. Further, other than such wireless communication, with a signal transmitted via a cable whereby the signal reflects off of the ends of the cable, interference can occur between the signal to be transmitted and the reflected signal.

Now, a method to remove influence of the interference occurring from a multipath using a Viterbi equalizer is disclosed in Japanese Patent No. 3399022, for example. However, with signal processing as to a signal regarding which high-speed transmission is preferable, such as an image signal, particularly a non-compressed image signal, shortening the delay occurring with the signal processing and causing the delay to be a constant is desirable. Also, the image signal is preferably in real time in order to maintain continuity.

With a Viterbi equalizer, shortening the delay occurring with signal processing and causing the delay to be a constant are both difficult, and accordingly, maintaining a real time feature is also difficult.

As described above, in an environment where a multipath occurs, an error can occur in a bit from interference resulting from the multipath when a signal is transmitted with wireless communication using radio waves.

The present invention is made with such a situation in mind, and enables readily correcting a routine data error that results from a multipath or the like.

A reception device and program according to an embodiment of the present invention is a reception device configured to receive a signal of a transmitted bit string transmitted from a transmission device which transmits a bit string, the reception device including: a receiving unit arranged to receive a signal from the transmission device and output a received bit string corresponding to the transmitted bit string; a storing unit arranged to store an error rate table wherein the received bit string is correlated with an error rate of post-data which is data of one bit or greater received following the received bit string being in error; and an error correcting unit arranged to perform error correcting of the post-data of the received bit string, and a program to cause a computer to function as a reception device.

A reception method according to an embodiment of the present invention is a reception method for a reception device arranged to receive a signal of a transmitted bit string transmitted from a transmission device which transmits a bit string, the reception method including the steps of: receiving a signal from the transmission device and outputting a received bit string corresponding to the transmitted bit string; referencing an error rate table which correlates error rate between the received bit string and error of post-data which is data of one bit or greater received at the end of the received bit string; and error correcting of the post-data of the received bit string.

According to an embodiment of the present invention, a signal of a transmitted bit string transmitted from the transmission device which transmits a bit string is received, and a received bit string corresponding to the transmitted bit string is output. An error rate table wherein the received bit string and post-data which is data of one bit or greater received at the end of the received bit string are in error are correlated, and error correcting of the post-data of the received bit string is performed.

An information processing device and program according to an embodiment of the present invention is an information processing device arranged to create an error rate table employed for error correcting, the information processing device including: a receiving unit arranged to receive a signal of test data which is a known transmitted bit string transmitted from a transmission device which transmits a bit string, and outputs a received bit string corresponding to the test data; and a creating unit arranged to create the error rate table of error rate wherein the received bit string and the post-data of the received bit string are in error are correlated by determining the error of the post data which is data of one bit or greater received at the end of the received bit string, by comparing the received bit string and the test data, and based on the determination results thereof, finding the error rate wherein the post-data of the received bit string is in error, and a program to cause a computer to function as an information processing device.

An information processing method according to an embodiment of the present invention is an information processing method for an information processing device arranged to create an error rate table employed for error correcting, the information processing method including the steps of: receiving a signal of test data which is a known transmitted bit string transmitted from a transmission device which transmits a bit string, and outputting a received bit string corresponding to the test data; and creating the error rate table wherein the received bit string and an error rate of the post-data of the received bit string being in error are correlated by determining the error of the post data which is data of one bit or greater received at the end of the received bit string, by comparing the received bit string and the test data, and based on the determination results thereof, finding the error rate wherein the post-data of the received bit string is in error.

With an embodiment of the present invention, a signal of test data which is a known transmitted bit string transmitted from a transmission device that transmits a bit string is received, and received bit string corresponding to the test data is output. By comparing the received bit string and the test data, any error of the post-data which is data of one bit or greater received at the end of the received bit string is determined, and based on the determination results thereof, by finding the error rate wherein the post-data of the received bit string is in error, an error rate table is created wherein the received bit string and an error rate of the post-data of the received bit string being in error are correlated.

Note that a program can be provided by transmitting via a transmitting medium or by recording onto a recording medium.

Also, the reception device and information processing device may be independent devices, or may be an internal block making up one device.

According to the above configurations, data error can be corrected, and in particular, for example, a routine error of data resulting from a multipath or the like can be readily corrected.

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to the other features of the claims.

The reception device and program according to an embodiment of the present invention is a reception device (e.g. a reception processing unit 112 in FIG. 7) configured to receive a signal of a transmitted bit string transmitted from a transmission device (e.g. a transmission processing unit 101 in FIG. 7) which transmits a bit string, the reception device including: a receiving unit (e.g. a wireless signal reception unit 151 in FIG. 7) arranged to receive a signal from the transmission device and output a received bit string corresponding to the transmitted bit string; a storing unit (e.g. table storing unit 155 in FIG. 7) arranged to store an error rate table wherein the received bit string is correlated with an error rate of post-data which is data of one bit or greater received following the received bit string being in error; and an error correcting unit (e.g. an error correcting unit 156 in FIG. 7) arranged to perform error correcting of the post-data of the received bit string, and a program to cause a computer to function as a reception device.

With the reception device according to the above configuration, a creating unit (e.g. table generating unit 154 in FIG. 7) is provided wherein, in the case that the receiving unit receives test data which is a known transmitted bit string transmitted from the transmission device and output a received bit string corresponding to the test data, the received bit string and test data are compared, whereby any error in the post-data of the received bit string is determined, and based on the determination results thereof, by finding the error rate wherein the post-data of the received bit string is in error, the error rate table is created.

The transmission device increases the bit length of the test data while repeating transmission of the test data (e.g. steps S161 through S166 in FIG. 16); wherein the receiving unit receives the test data and outputs the received bit string (e.g. step S173 in FIG. 17); and wherein the creating means determines the error of the post-data of the received bit string, and based on the determination results thereof finds the error rate wherein the post-data of the received bit string is in error (e.g. steps S175 and S176 in FIG. 17), repeating this until the received bit string wherein the error rate of the post-data of 1.0 no longer changes (e.g. steps S171 through S181 in FIG. 17); whereby the storing unit stores the error rate table wherein the received bit string as to the test data of the bit length when the received bit string with the post-data error rate of 1.0 no longer changes and the error rate are correlated.

The reception method according to an embodiment of the present invention is a reception method for a reception device arranged to receive a signal of a transmitted bit string transmitted from a transmission device which transmits a bit string, the reception method including the steps of: receiving a signal from the transmission device and outputting a received bit string corresponding to the transmitted bit string (e.g. step S121 in FIG. 12); referencing an error rate table which correlates error rate between the received bit string and error of post-data which is data of one bit or greater received at the end of the received bit string; and error correcting of the post-data of the received bit string (e.g. step S124 in FIG. 12).

The information processing device or program according to an embodiment of the present invention is an information processing device or a program arranged to cause a computer to function as an information processing device, wherein the information processing device (e.g. the reception processing unit 112 in FIG. 7) is arranged to create an error rate table employed for error correcting, and includes: a receiving unit (e.g. the wireless signal reception unit 151 in FIG. 7) arranged to receive a signal of test data which is a known transmitted bit string transmitted from a transmission device which transmits a bit string, and outputs a received bit string corresponding to the test data; and a creating unit (e.g. the table creating unit 154 in FIG. 7) arranged to create the error rate table wherein the received bit string and an error rate of the post-data of the received bit string are in error are correlated by determining the error of the post data which is data of one bit or greater received at the end of the received bit string, by comparing the received bit string and the test data, and based on the determination results thereof, finding the error rate wherein the post-data of the received bit string is in error.

The information processing method according to an embodiment of the present invention is an information processing method for an information processing device arranged to create an error rate table employed for error correcting, including the steps of: receiving a signal of test data which is a known transmitted bit string transmitted from a transmission device which transmits a bit string, and outputting a received bit string corresponding to the test data (e.g. step S121 in FIG. 12); and creating the error rate table of error rate wherein the received bit string and the post-data of the received bit string are in error are correlated by determining the error of the post data which is data of one bit or greater received at the end of the received bit string, by comparing the received bit string and the test data, and based on the determination results thereof, finding the error rate wherein the post-data of the received bit string is in error (e.g. step S126 in FIG. 12).

BRIEF DESCRIPTION OF THE DRAWINGS

FIGS. 5A and 5B are diagrams describing distortion of a signal generated by the multi-bus;

DESCRIPTION OF THE PREFERRED EMBODIMENTS

The specific embodiments to which the present invention is applied will be described below in detail with reference to the diagrams.

Figure 2:
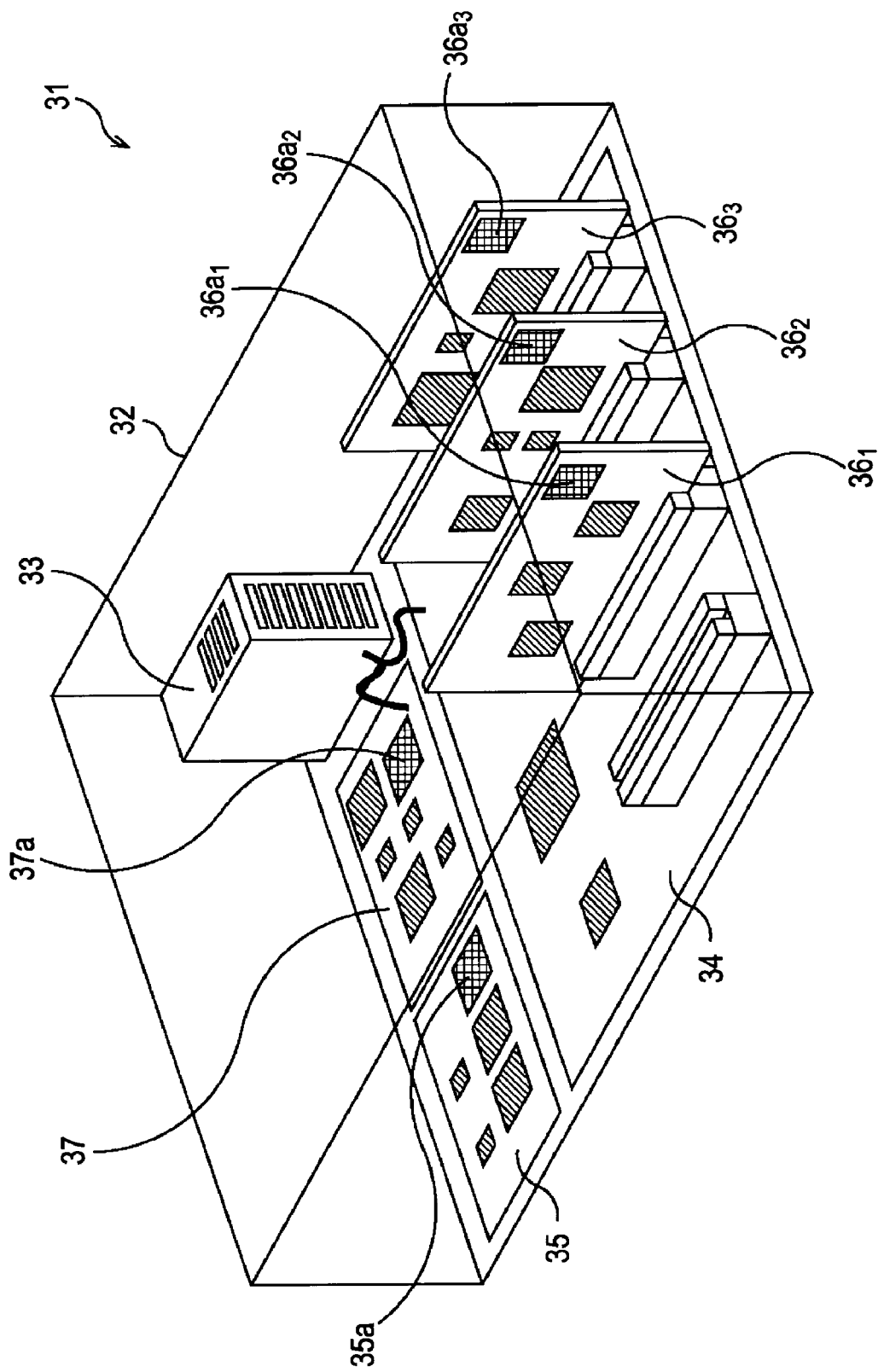
FIG. 2 is a perspective view illustrating a configuration example according to an embodiment of a signal processing device to which the present invention is applied.

FIG. 2 is a perspective view showing a configuration example of an embodiment of a signal processing device to which the present invention is applied. In FIG. 2, a signal processing device 31 is made up of a casing 32, power source module 33, board (platform board) 34, board (input board) 35, board (signal processing boards) $36_1$ through $36_3$, and board (output board) 37.

The casing 32 is a metallic casing in a rectangular parallelepiped shape, and the power source module 33, platform board 34, input board 35, signal processing boards $36_1$ through $36_3$, and output board 37 are stored therein.

The power source module 33 supplies electrical power necessary for driving to the platform board 34, input board 35, signal processing boards $36_1$ through $36_3$, and output board 37.

The signal processing boards $36_1$ through $36_3$ are mounted on the platform board 34. Note that power is supplied to the signal processing boards $36_1$ through $36_3$ from the power source module 33 via the platform board 34.

The input board 35 is connected to the connectors $13_1$ through $13_4$ (FIG. 3) provided external to the casing 32, and for example an image signal is supplied to the input board 35 from an external device (not shown) connected via the connector $13_i$. Also, the input board 35 has an antenna 35a to perform wireless communication using radio waves, and the image signal supplied from the external device is transmitted (sent) to the signal processing boards $36_1$ through $36_3$ via an antenna 35a.

The signal processing boards $36_1$ through $36_3$ have antenna $36a_1$ through $36a_3$ respectively for the purpose of performing wireless communication using radio waves. An image signal transmitted from the input board 35 is supplied to the signal processing board $36_i$ via the antenna $36a_i$. The signal processing board $36_i$ performs signal processing such as noise removal processing, image converting processing, or image adjusting processing as to the image signal from the input board 35, and transmits the image signal subjected to signal processing to the output board 37 via the antenna $36a_i$.

The output board 37 has an antenna 37a for the purpose of performing wireless communication using radio waves, and is connected to the connector 19 (FIG. 3) provided on the casing 32. The output board 37 receives an image signal transmitted from the signal processing boards $36_1$ through $36_3$ via the antenna 37a, and supplies this to the display device (not shown) connected to the connector 19.

Figure 1:
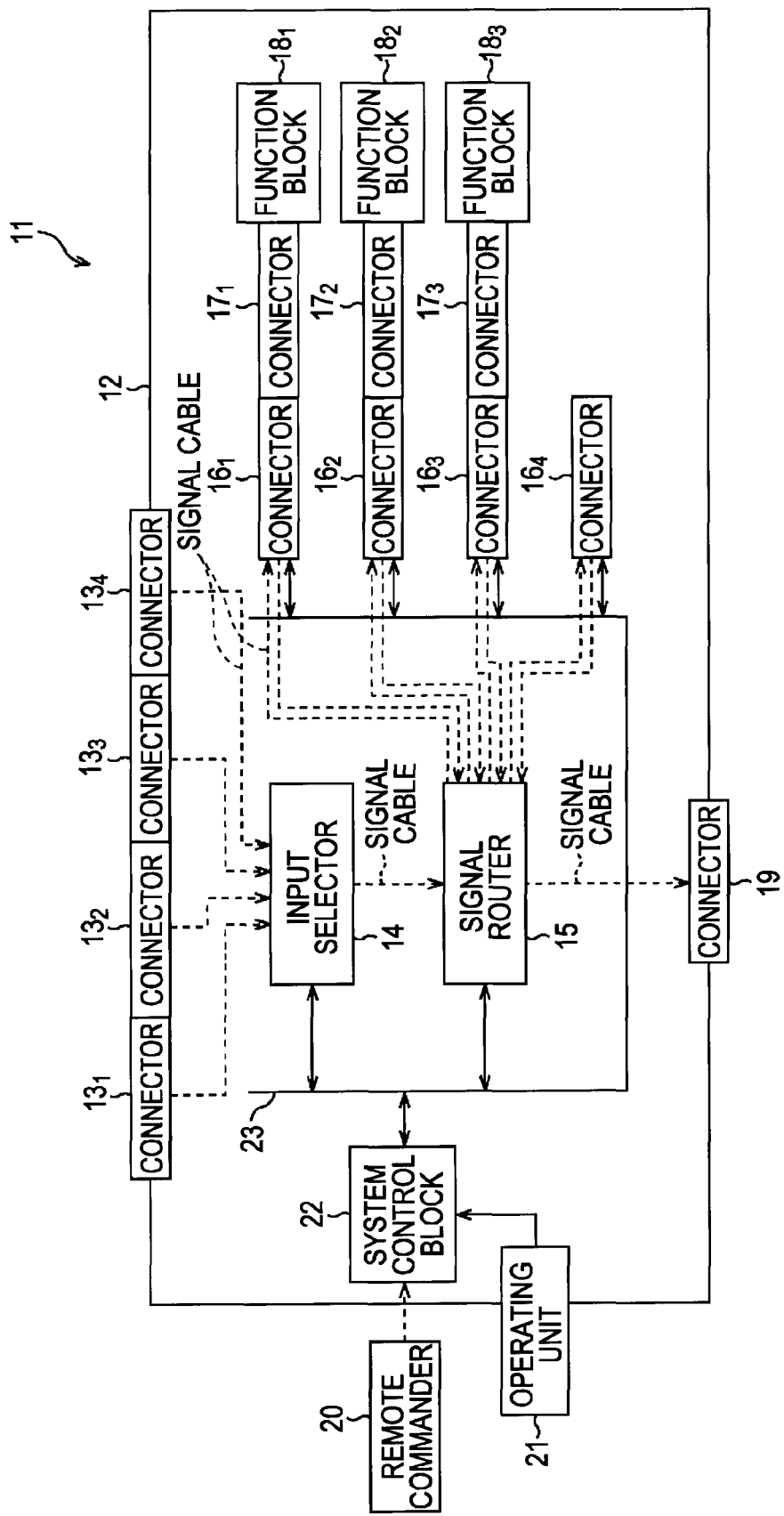
FIG. 1 is a block diagram illustrating a configuration example of a signal processing device according to the related art.
Figure 3:
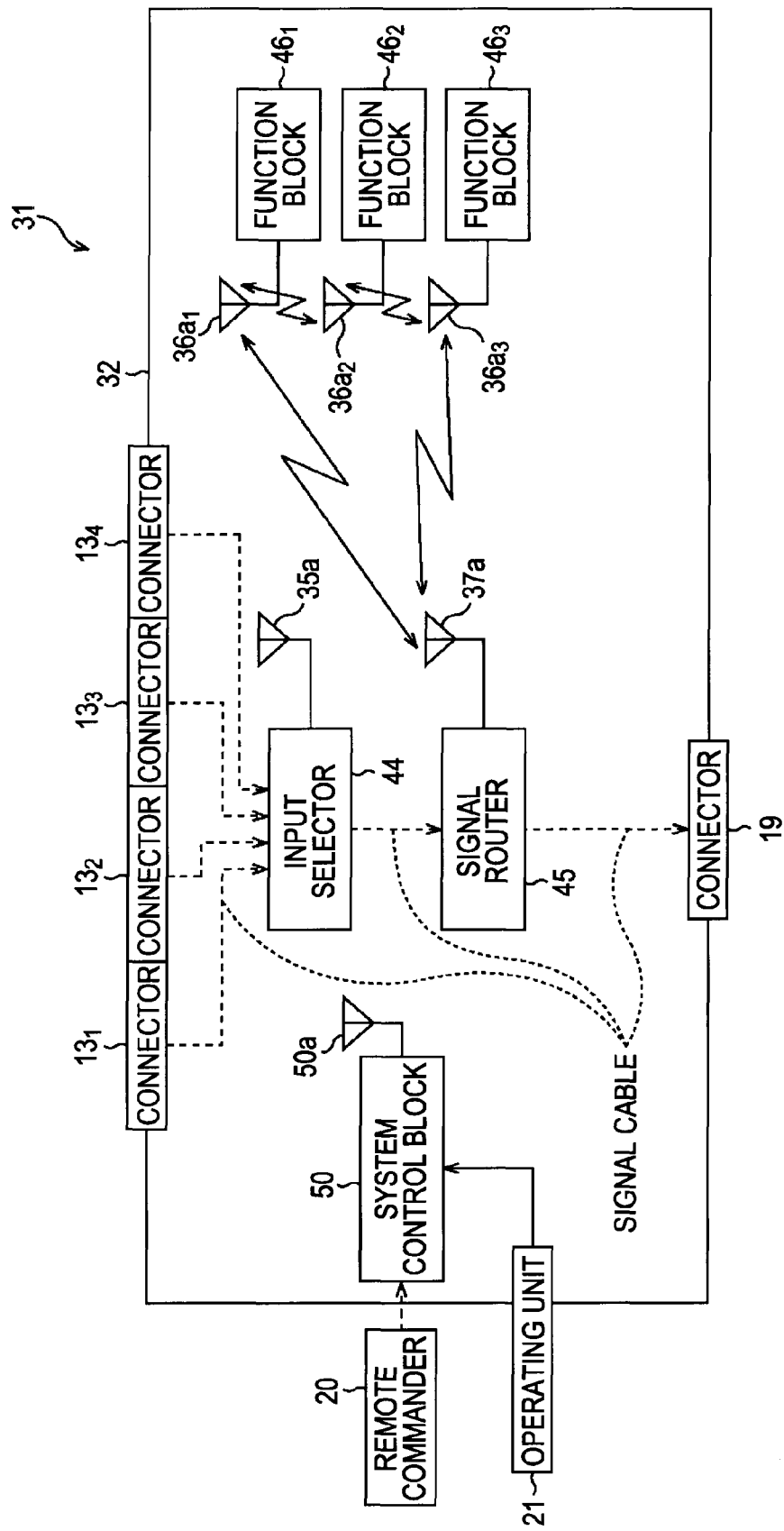
FIG. 3 is a block diagram illustrating an electrical configuration example according to an embodiment of a signal processing device to which the present invention is applied.

Next, FIG. 3 is a block diagram showing an electrical configuration example of the signal processing device 31 in FIG. 2. Note that in FIG. 3, the portions corresponding to the signal processing device 11 in FIG. 1 are denoted with the same reference numerals, and the description thereof is omitted as appropriate.

In FIG. 3, the signal processing device 31 is made up of connectors $13_1$ through $13_4$, connector 19, remote commander 20, operating unit 21, casing 32, input selector 44, signal router 45, function blocks $46_1$ through $46_3$, and system control block 50.

With the signal processing device 31, the connectors $13_1$ through $13_4$ are connected to the input selector 44 via a signal cable, and the input selector 44 is connected to the signal router 45 via a signal cable, and the signal router 45 is connected to the connector 19 via a signal cable.

The input selector 44, signal router 45, function blocks $46_1$ through $46_3$, and system control block 50 are stored within the casing 32. The input selector 44 is provided on the input board 35 in FIG. 2, for example, and is enabled to perform wireless communication via the antenna 35a provided on the input board 35.

Also, an image signal is supplied from an unshown external device to the input selector 44 via the connectors $13_1$ through $13_4$. The input selector 44 selects the image signal supplied from the external device connected to the connectors $13_1$ through $13_4$ and supplies this to the signal router 45, in accordance with the control of the system control block 50.

The signal router 45 is provided on the output board 37 in FIG. 2 for example, and is enabled to perform wireless communication via the antenna 37*a* provided on the output board 37. The signal router 45 transmits the image signal supplied from the input selector 44 to the function blocks $46_1$ through $46_3$ by wireless communication using radio waves via the antenna 37*a*, according to control by the system control block 50. Also, the signal router 45 receives the image signal transmitted from the function blocks $46_1$ through $46_3$ by wireless communication using radio waves via the antenna 37*a*, and supplies this to a display device (not shown) connected to the connector 19 via the connector 19.

The function blocks $46_1$ through $46_3$ are provided on the signal processing boards $36_1$ through $36_3$ respectively, for example, and are enabled to perform wireless communication via the antennas $36a_1$ through $36a_3$ respectively which are provided on the signal processing boards $36_1$ through $36_3$.

The function block $46_i$ receives the image signal transmitted from the signal router 45 by wireless communication using radio waves via the antenna $36a_i$, and subjects the image signal thereof to signal processing such as noise removing processing, image converting processing, or image adjusting processing. The function block $46_i$ transmits the image signal subjected to signal processing to the signal router 45 by wireless communication using radio waves via the antenna $36a_i$. Also, the function blocks $46_i$ and $46_{i'}$ also transmit and receive signals by wireless communication between each other via the antennas $36a_i$ and $36a_{i'}$, as necessary.

Note that in the case that individually distinguishing the function blocks $46_1$ through $46_3$ is not of particular importance, these will be collectively referred to as "function block 46". Similarly, the antennas $36a_i$ and $36a_{i'}$ will be collectively referred to as "antenna $36a$".

The system control block 50 is provided on the platform board 34 in FIG. 2, for example, and is enabled to perform wireless communication via an antenna 50*a* not illustrated in FIG. 2 which is provided on the platform board 34.

Also, an operating signal is supplied from the remote commander 20 and operating unit 21 to the system control block 50. Upon the operating signal according to user operation being supplied from the remote commander 20 or operating unit 21, the system control block 50 controls the input selector 44, signal router 45, and function block 46 by wireless communication using radio waves via the antenna 50*a* so that the processing according to such operating signal is performed.

Within the casing 32 of the signal processing device 31 configured as described above, one arbitrary block of the input selector 44, signal router 45, function block 46, and system control block 50 serves as the transmission device, while at least one of the other blocks serves as the reception device, and the transmission device transmits an image signal, control signal, or other signal, for example, by wireless communication using radio waves. The reception device then receives the signal from the transmission device.

In order to simplify description, focus will be on the signal router 45 and function block 46, and description will be given for wireless communication performed within the casing 32 by the signal router 45 and function block 46.

Figure 4:
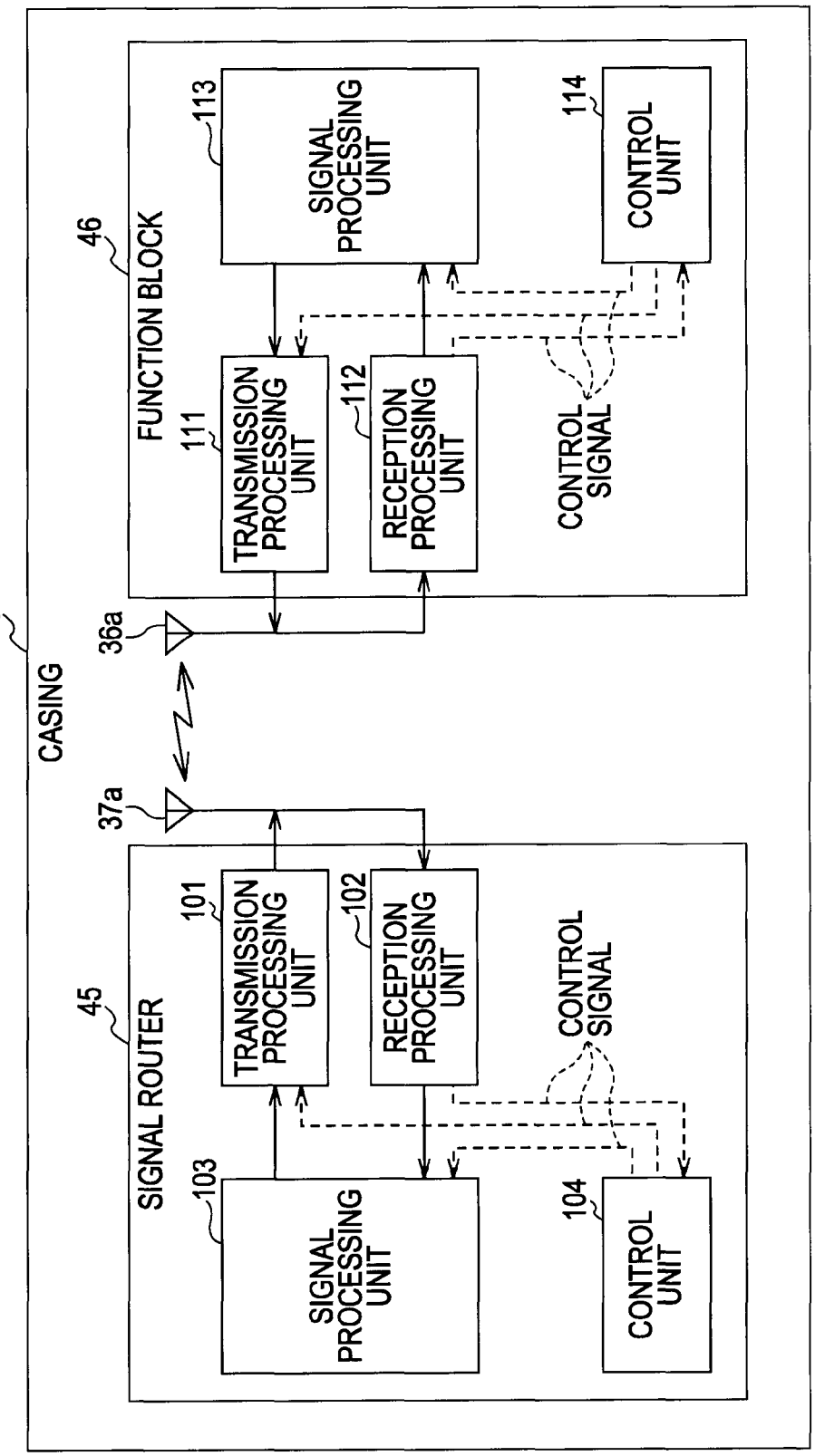
FIG. 4 is a block diagram illustrating a configuration example of a communication system configured with a signal router 45 and function block 46 in a casing 32.

FIG. 4 is a block diagram showing a configuration of a communication system configured with a signal router 45 and function block 46 within the casing 32 (system refers to a theoretical collection of multiple devices, and whether or not the each configured device is within the same casing is not important).

The signal router 45 is made up of the transmission processing unit 101, reception processing unit 102, signal processing unit 103, and control unit 104.

The transmission processing unit 101 performs transmission processing to transmit data supplied from the signal processing unit 103 (e.g. image signal) or a control signal or the like supplied from the control unit 104, with radio waves from the antenna 37*a*.

The reception processing unit 102 performs reception processing to receive a signal supplied from the antenna 37*a* by the antenna 37*a* receiving radio waves, and supplies the data obtained as a result (including a control signal) to the signal processing unit 103 or control unit 104 as necessary.

The signal processing unit 103 performs predetermined signal processing as the signal router 45 as to the data supplied from the reception processing unit 102, and supplies the data obtained as a result thereof to the transmission processing unit 101.

The control unit 104 controls the transmission processing unit 101, reception processing unit 102, and signal processing unit 103, for example, according to the control signal or the like supplied from the reception processing unit 102.

The function block 46 is made up of a transmission processing unit 111, reception processing unit 112, signal processing unit 113, and control unit 114. Note that the transmission processing unit 111, reception processing unit 112, signal processing unit 113, and control unit 114 are configured similar to the transmission processing unit 101, reception processing unit 102, signal processing unit 103, and control unit 104 of the signal router 45, so the description thereof will be omitted.

With a communication system configured as described above, in the case that data is transmitted from the signal router 45 to the function block 46 for example, at the signal router 45 the transmission processing unit 101 transmits the data and so forth supplied from the signal processing unit 103 with radio waves from the antenna 37*a*. The radio waves transmitted from the antenna 37*a* is received at the antenna 36*a* and the signal corresponding to the radio waves thereof is supplied to the reception processing unit 112 of the function block 46.

The reception processing unit 112 receives a signal from the antenna 36*a* and supplies the data obtained as a result thereof to the signal processing unit 113. With the signal processing unit 113, predetermined signal process as the function block 46 is performed as to the data supplied from the reception processing unit 102. Similarly, data can be transmitted from the function block 46 to the signal router 45 also.

Note that hereafter, description will be given with the signal router 45 serving as the transmission device to transmit data, and the function block 46 serving as the reception device to receive data.

Next, since the signal router 45 and function block 46 are stored in the casing 32, radio waves reflect within the casing 32, whereby a multipath occurs.

Upon a multipath occurring, at the signal router 45 serving as the transmission device, the signal of the bit transmitted at the end receives the influence of the signal of the bit transmitted earlier (in the past), and consequently the waveform of the signal of the bit transmitted later can be distorted (deformed), whereby error can occur to the bit reproduced at the function block 46 serving as the reception device.

The distorting of the signal (waveform) occurring from the multipath will be described with reference to FIGS. 5A and 5B.

FIG. 5A shows a transmitted bit string which is a certain bit string serially transmitted by the signal router 45 serving as the transmission device, and the waveform of the signal (transmission signal) of the last one bit of the transmitted bit string thereof (the one bit transmitted at the end).

FIG. 5B shows a received bit string which is a bit string corresponding to the transmitted bit string from the signal router 45 wherein the transmission signal from the signal router 45 is received at the function block 46 serving as the reception device and reproduced from the obtained reception signal, and the waveform of the signal (reception signal) of for example the last one bit as the post-data (one bit received at the end) which is data of one bit or greater received at the end of the received bit string thereof.

In FIG. 5A, the transmission signal transmitted from the signal router 45 to the function block 46 is a signal having amplitude value of roughly 0.25 when the transmitted bit is 1, and the amplitude value is roughly −0.25 when the transmitted bit is 0.

In FIG. 5A, a seven-bit bit string 1, 0, 0, 1, 0, 1, 1 serving as the transmitted bit string is transmitted in the order thereof, and of the transmitted bit string thereof, the last transmission signal of the bit with a value of 1 has an amplitude value of roughly 0.25 and is in a linear form.

On the other hand, in FIG. 5B, the receiving signal of the post-data of the received bit string, i.e. in this case, the receiving signal of the one bit received bit corresponding to the one last bit of the transmitted bit string with a value of 1 is not in a linear form as with the corresponding transmission signal in FIG. 5A, but rather is distorted.

With the signal router 45, as shown in FIG. 5A, the seven-bit bit string 1, 0, 0, 1, 0, 1, 1 is transmitted in the order thereof, but with the multipath occurring within the casing 32, the transmission signals of the six bits 1, 0, 0, 1, 0, 1, transmitted before the last one bit arrive at the function block 46 delayed. Therefore, the transmission signals arriving delayed interfere with the transmission signal of the last one bit, and as a result, distortion occurs to the last one bit of the reception signal obtained with the function block 46.

From the distortion occurring to the reception signal, the received bit to be reproduced as a bit with a value of 1 may be reproduced in error as a bit with a value of 0. Note that according to the reception signal in FIG. 5B, the last one bit of the received bit string for example has a high probability of being reproduced as a bit with a value of 1 by so-called firm determination, but depending on the transmitted bit transmitted beforehand may be reproduced as error values.

The power source module 33, platform board 34, input board 35, signal processing boards 36₁ through 36₃, and output board 37 are each fixed within the casing 32 of the signal processing device 31 (FIG. 2). Accordingly, with the wall face or various boards of the casing 32, radio waves constantly reflect similarly, and the interference of the radio waves reflected from the wall face of the casing 32, the input board 35 and the various boards, i.e. the influence of the multipath, becomes routine. If the influence from the multipath is routine, the errors occurring to the received bit (rows) is also routine.

Figure 6:
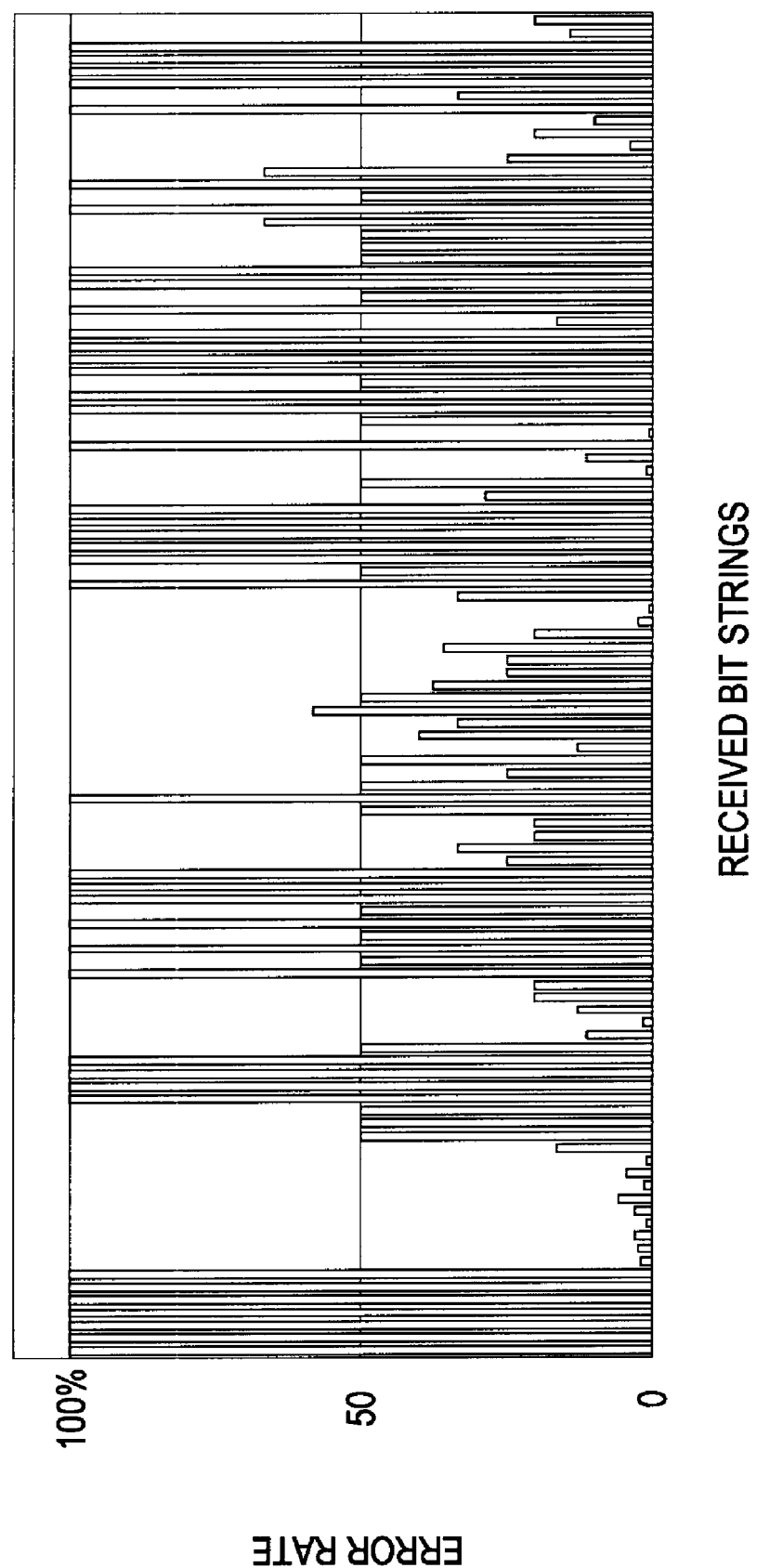
FIG. 6 is a diagram illustrating an error rate wherein, of a received bit string of 24 bits, the last one bit is in error.

That is to say, FIG. 6 shows the error rate that the last one bit is in error, for example, of post-data which is data of one bit or greater received at the end of a received bit string corresponding to the transmitted bit string of 24 bits which is obtained by receiving a transmitted bit string of 24 bits transmitted from the signal router 45 received at the function block 46.

In FIG. 6, the horizontal axis shows the received bit string (a portion of a possible pattern thereof), and the vertical axis shows the error rate that the last one bit of the received bit string is in error. According to FIG. 6, we can see that there are received bit strings wherein the error rate of the last one bit is 1.0 (100), and there are received bit strings wherein the error rate of the last one bit is infinitely near 0 (0).

That is to say, there is a great bias to the probability (error rate) of a certain bit being in error, depending on the bit string received before such bit (in the past), and a routine error occurs wherein the last one bit is in error with a specified received bit string.

FIG. 6 shows the error in the post-data in each received bit in the case that the post-data is the last one bit of the received bit string, but also in the case that the post-data is multiple bits received at the end of the received bit string equivalent to the last one byte of the received bit string, similar to the case in FIG. 6, routine errors occur in the post-data.

Hereafter in order to simplify the description, let us say that the post-data is the last one bit of the received bit string. Note that how many bits received of the received bit string should the post-data be can be determined at the time of design, for example, or can be determined according to the user operations.

The way that errors routinely occur as described above does not change as long as there is no change to the way that a multipath occurs, i.e. as long as there is no change to the communication environment within the casing 32, such as change (deforming) of the shape of the casing 32, change to the positions of the boards 34 through 37 within the casing 32, change to the positions of the antennas 35a through 37a and 50a, and so forth.

The function block 46 serving as a reception device learns the features of the routine errors occurring in the post-data as described above (the way that errors routinely occur), and based on the features thereof, correct the errors occurring to the post-data of the received bit string, and equivalently improve the communication quality of the wireless communication path within the casing 32.

Figure 7:
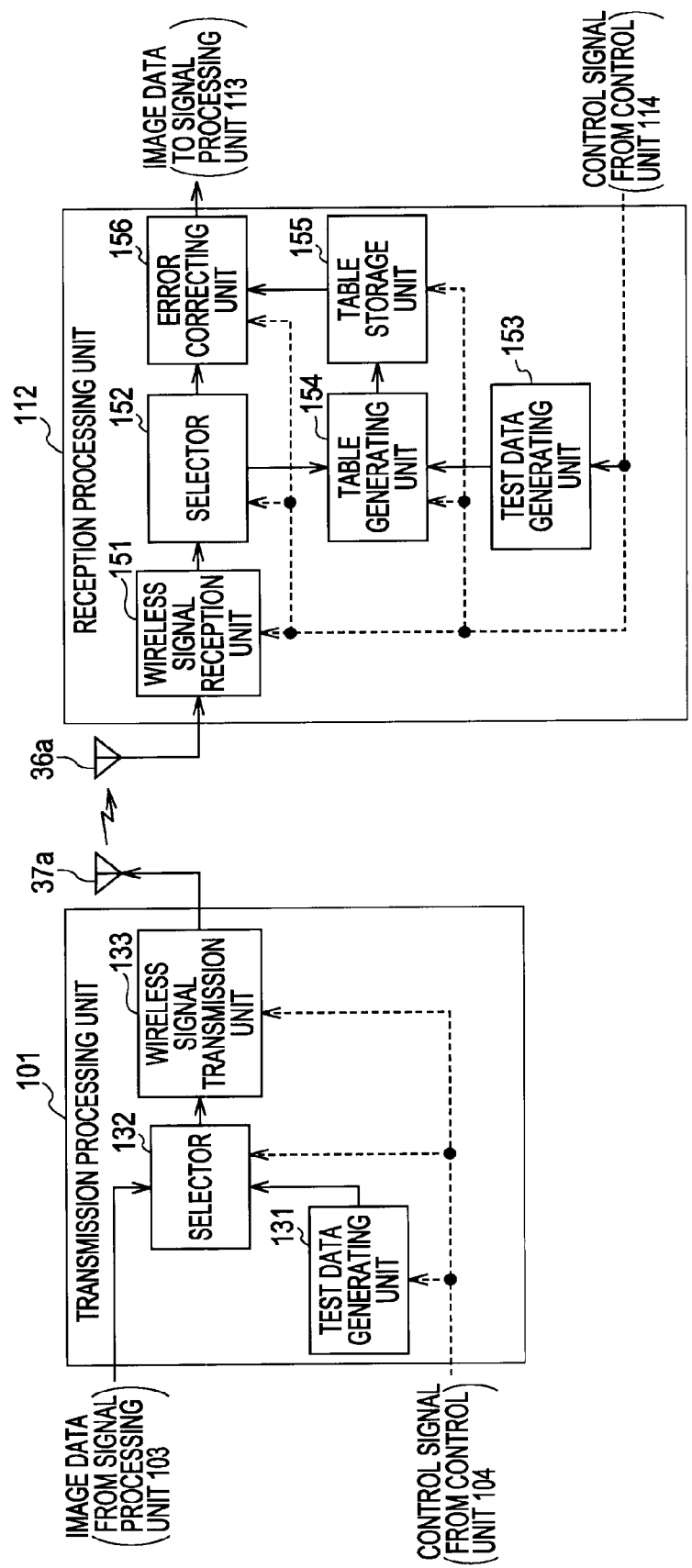
FIG. 7 is a block diagram illustrating a configuration example of a transmission processing unit 101 and reception processing unit 112.

FIG. 7 shows a configuration example of the transmission processing unit 101 of the signal router 45 serving as a transmission device (FIG. 4) and the reception processing unit 112 of the function block 46 serving as a reception device (FIG. 4).

The transmission processing unit 101 is made up of a test data generating unit 131, selector 132, and wireless signal transmission unit 133. A control signal is supplied from the control unit 104 (FIG. 4) to the test data generating unit 131, selector 132, and wireless signal transmission unit 133 making up the transmission processing unit 101.

The test data generating unit 131 generates test data which is a known transmitted bit string under the control of a control signal from the control unit 104, and supplies this to the selector 132. Test data is supplied from the test data generating unit 131 to the selector 132, and also an image signal (image data) is supplied from the signal processing unit 103 (FIG. 4). The selector 132 selects one of the transmitted bit string serving as image data from the signal processing unit 103 or the test data supplied from the test data generating unit 131 under the control of a control signal from the control unit 104, and supplies this to the wireless signal transmission unit 133.

The wireless signal transmission unit 133 modulates the transmitted bit string serving as image data from the selector 132 or the test data from a baseband signal to an RF (Radio Frequency) signal under the control of a control signal from the control unit 104, and transmits this via the antenna 37a.

The reception processing unit 112 is made up of a wireless signal reception unit 151, selector 152, test data generating unit 153, table generating unit 154, table storing unit 155, and error correcting unit 156.

A control signal is supplied from the control unit 114 (FIG. 4) to the wireless signal reception unit 151, selector 152, test data generating unit 153, table generating unit 154, table storing unit 155, and error correcting unit 156 that make up the reception processing unit 112. Under the control of a control signal from the control unit 114, the wireless signal reception unit 151 receives an RF signal transmitted from the transmission processing unit 101 via the antenna 36a, and demodulates this to a baseband signal. The wireless signal reception unit 151 then outputs a received bit string corresponding to the transmitted bit string (including test data) obtained as a result of the demodulating to the selector 152. Under the control of a control signal from the control unit 114, the selector 152 selects one of the table generating unit 154 or error correcting unit 156, and supplies the received bit string from the wireless signal reception unit 151 to that which has been selected.

That is to say, in the case that the received bit string from the wireless signal reception unit 151 is a received bit string corresponding to the transmitted bit string serving as the pixel data (pixel value) of a valid image period of the image data, the selector 152 supplies such received bit string to the error correcting unit 156.

Also, in the case that the received bit string from the wireless signal reception unit 151 is a received bit string corresponding to the transmitted bit string serving as test data, the selector 152 supplies such received bit string to the table generating unit 154. Under the control of a control signal from the control unit 114, the test data generating unit 153 generates test data which is the same as the test data generated by the test data generating unit 131 of the transmission processing unit 101 which is a communication partner with the reception processing unit 112, in the same order, and supplies this to the table generating unit 154. Under the control of a control signal from the control unit 114, the table generating unit 154 compares the received bit string corresponding to the test data which is supplied from the selector 152 and the test data supplied from the test data generating unit 153, i.e. the correct values of the received bit string supplied from the selector 152, thereby determining any error in the last one bit serving as post-data which is data of one bit or greater received at the end of the received bit string from the selector 152, and based on the determination results thereof, finds the error rate that such post-data is in error, thereby creating an error rate table correlating the received bit string for each pattern and the error rate wherein the post-data of such received bit string is in error as a feature of a routine error occurring in the post-data.

The table generating unit 154 supplies the error rate table to the table storing unit 155. Under the control of a control signal from the control unit 114, the table storing unit 155 stores the error rate table supplied from the table generating unit 154. Under the control of a control signal from the control unit 114, the error correcting unit 156 references the error rate table stored in the table storing unit 155, performs error correcting on the last one bit serving as post-data of the received bit string serving as image data supplied from the selector 152, and supplies the image data serving as the post-data after error correcting thereof to the signal processing unit 113 (FIG. 4).

Figure 8:
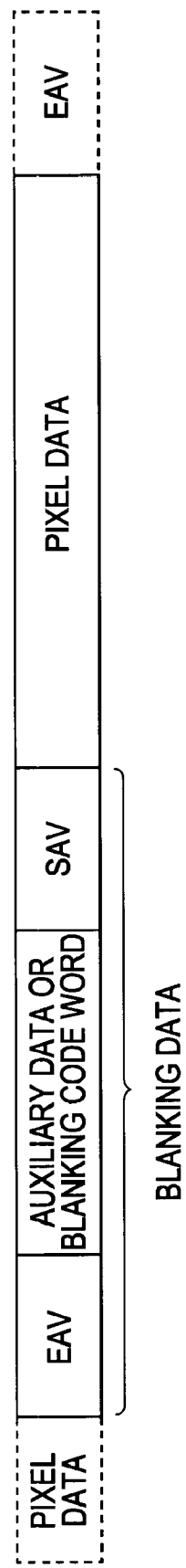
FIG. 8 is a diagram illustrating an example of an image data format.

FIG. 8 shows an image data format supplied from the signal processing unit 103 (FIG. 4) as to the selector 132 in FIG. 7. Image data conforming to HD-SDI (Bit-Serial Digital Interface for High-Definition Television System) standard which is one of a digital interface, for example, is supplied from the signal processing unit 103 to the selector 132.

With a bit string serving as image data conforming to HD-SDI standards, pixel data in a valid image period and blanking data are arrayed alternately. With blanking data, a bit string EAV (End of Active Video), auxiliary data or a blanking code word, and a bit string SAV (Start of Active Video) are arrayed in that order. The bit string EAV indicates the end of the valid image period and the bit string SAV indicates the start of a valid image period.

The selector 132 in FIG. 7 selects image data from the signal processing unit 103 (FIG. 4) in the valid image period, i.e. pixel data, and supplies this to the wireless signal transmission unit 133. Also, the selector 132 selects test data from the test data generating unit 131 outside of the valid image period, and supplies this to the wireless signal transmission unit 133.

Accordingly, with the transmission processing unit 101, pixel data is transmitted within the valid image period and test data is transmitted outside of the valid image period. Similarly, with the reception processing unit 112, the selector 152 selects the error correcting unit 156 within the valid image period, and supplies the received bit string corresponding to the transmitted bit string serving as pixel data which is supplied from the wireless signal reception unit 151 to the error correcting unit 156. Also, the selector 152 selects the table generating unit 154 outside of the valid image period, and supplies the received bit string corresponding to the transmitted bit string serving as test data which is supplied from the wireless signal reception unit 151 to the table generating unit 154.

Note that in FIG. 7, the selector 132 detects the SAV and EAV in the bit string serving as image data from the signal processing unit 103, and confirms (determines) the segment from the SAV being detected until the EAV being detected as the valid image segment. Also, the selector 132 confirms the segment from the EAV being detected until the SAV being detected (segment from immediately following the EAV until immediately before the SAV) as a segment outside the valid image segment (blanking segment).

Figure 9:
FIG. 9 is a diagram illustrating an example of an error rate table.

FIG. 9 shows an example of the error rate table created with the table generating unit 154 in FIG. 7 and stored in the table storage unit 155. With the error rate table, as described above, the received bit string for each pattern and the error rate wherein the last one bit of the received bit string thereof serving as post-data are correlated.

The error rate table in FIG. 9 is an error rate table for received bit strings corresponding to the test data wherein the bit length is 24 bits, and therefore, the received bit string of 24 bits and the error rate are correlated.

Note that FIG. 9 shows values expressed as decimal numerals for received bit strings of 24 bits, the received bit strings thereof being bit strings arrayed in the order received from the reception processing unit 112 (the order in which the bit string serving as the test data has been transmitted from the transmission processing unit 101) from LSB (Least Significant Bit) towards MSB (Most Significant Bit). In the following, a binary received bit string will be arrayed and expressed in the order received at the reception processing unit 112 from LSB towards MSB.

With the error rate table in FIG. 9, for example, the decimal numeral "530083" as a received bit string becomes "0000 1000 0001 0110 1010 0011" when expressed as a binary numeral. Further, the error rate correlated with the decimal numeral "530083" as the received bit string is 100 (1.0), and this shows that in the case that "0000 1000 0001 0110 1010

0011" appears as a 24-bit received bit string, the MSB which is the post-data thereof is in error. Thus, in the case that "0000 1000 0001 0110 1010 0011" appears in the received bit string supplied from the selector 152, the error correcting unit 156 in FIG. 7 corrects the MSB which is post-data to the correct values and outputs.

That is to say, with the bit length of the received bit string registered in the error rate table as a reference bit length to reference in the event of error correcting, the error correcting unit 156 compares the received bit string supplied from the selector 152 with the received bit string registered in the error rate table in increments of reference bit length.

In the case that the received bit string of the reference bit length from the selector 152 is not registered in the error rate table, and in the case that the received bit string is registered but the error rate correlated with the received bit string thereof is not 1.0, the error rate correcting unit 156 proceeds as if there is no error to the last one bit (MSB) which is the post data of a received bit string of the reference bit length from the selector 152, and outputs the one bit without change as the result of error correcting.

Also, in the case that the received bit string of the reference bit length from the selector 152 is registered in the error rate table, and the error rate correlated with the received bit string thereof is 1.0, the error correcting unit 156 proceeds as if the last one bit (MSB) which is the post-data of the received bit string of the reference bit length from the selector 152 is in error, corrects the one bit to the correct value, and outputs this as the result of error correcting.

Accordingly, in the case that the received bit string of the reference bit length from the selector 152 is "0000 1000 0001 0110 1010 0011" ("530083" in decimal numeral) with an error rate of 1.0, as described above, the last one bit "0" which is the post-data of the received bit string thereof is in error, so the error correcting unit 156 error-corrects the last one bit "0" which is the post-data thereof to the correct value "1", and outputs this.

Note that since the post-data which is the subject of error-correcting is one bit, the post-data thereof being in error means that the correct value is a value which inverts the one bit as post-data before the error correcting (0 if the one bit as post-data before error correcting is 1, and 1 if 0). Accordingly, in the case that the post-data which is the subject of error correcting is one bit, correlating the correct value of the post-data with the received bit string to the error rate table is not imperative (however, registration may be made).

Figure 10:
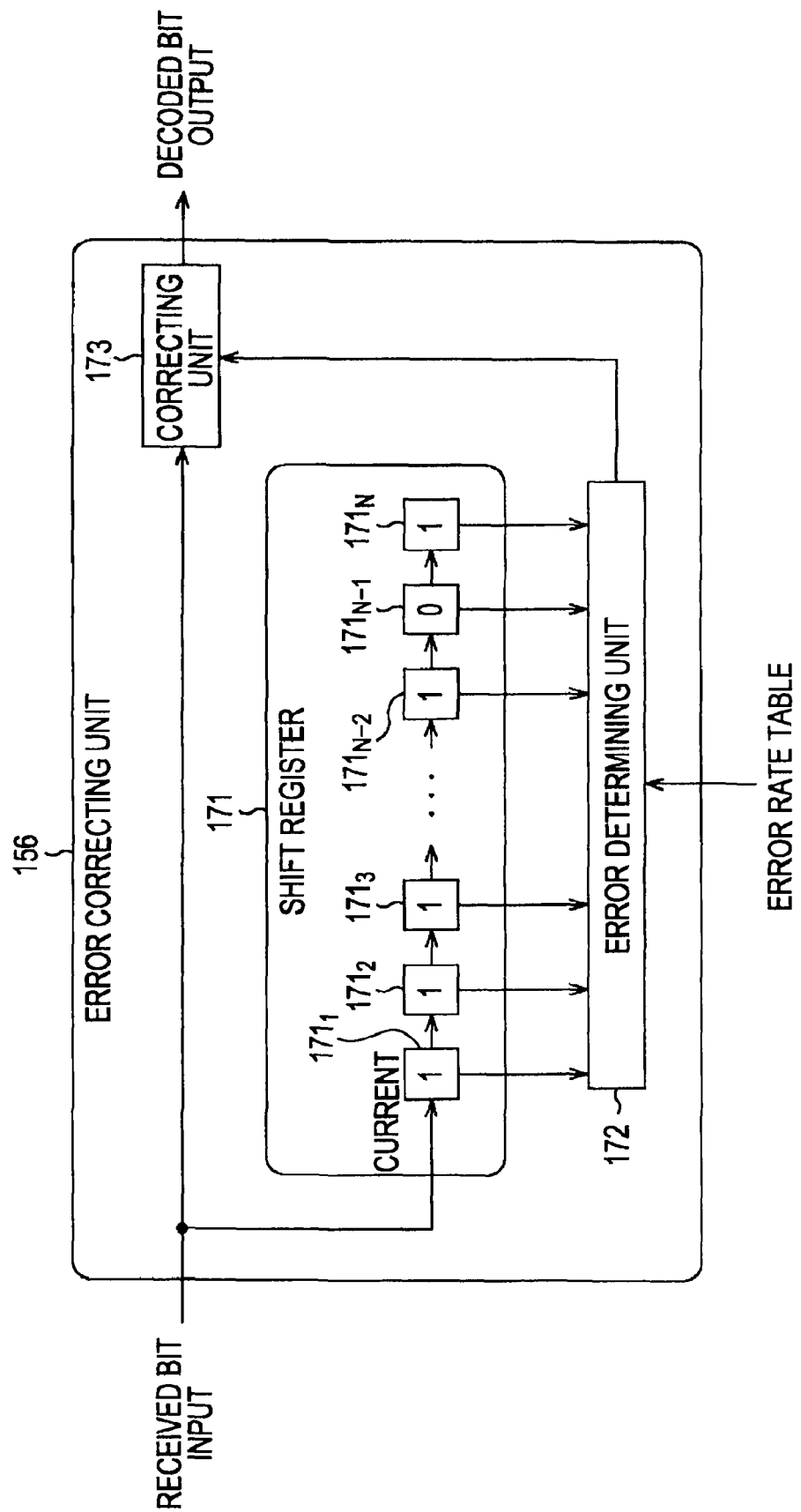
FIG. 10 is a block diagram illustrating a configuration example of an error correcting unit 156.

Next, FIG. 10 shows a configuration example of the error correcting unit 156 in FIG. 7. In FIG. 10, the error correcting unit 156 is made up of a shift register 171, error determining unit 172, and correcting unit 173.

A received bit string is supplied one bit at a time, in received order, to the shift register 171 from the selector 152 (FIG. 7). The shift register 171 is configured such that N number of registers $171_1$ through $171_N$ are serially connected, wherein N is a number matching the reference bit length which is a bit length of the received bit string registered in the error rate table, and configures a received bit string of reference bit length N by sequentially shifting the bits making up the received bit string from the selector 152.

That is to say, each time one bit of the received bit string from the selector 152 is supplied in received order, the shift register 171 makes up a received bit string of N bits made up of a bit of interest wherein the one bit is the bit of interest, and N−1 bits supplied from the selector 152 immediately before the bit of interest, i.e. makes up a received bit string of a reference bit length N.

Specifically, one bit as the bit of interest is supplied from the selector 152 to the leading register $171_1$ of N registers $171_1$ through $171_N$, and the register $171_1$ latches (stores) the one bit as the bit of interest thereof.

Following this, as to the leading register $171_1$, at a timing that a new bit of interest is supplied from the selector 152, each register $171_n$ of the second through N'th register latches the one bit which the upstream register $171_{n-1}$, and the leading register $171_1$ latches a new bit of interest from the selector 152.

Consequently, a received bit string of reference bit length N made up of a bit of interest and N−1 bits supplied from the selector 152 immediately before the bit of interest thereof is stored in the shift register 171.

Note that the reference bit length N which is the bit length of the received bit string registered in the error rate table matches the bit length N of the test data generated by the test data generating unit 131 (FIG. 7) (and the test data generating unit 153 (FIG. 7)). The bit length N of the test data generated by the test data generating unit 13 can be a fixed value at the time of design, for example, but as will be described later, an optimal value can be determined as a variable value from variable values.

In the case that the test data bit length N is a variable value, the reference bit length N also becomes a variable value, but the number N of the registers $171_1$ through $171_N$ making up the shift register 171 is dynamically changed so as to match the reference bit length N which is a variable value.

Changes to the number N of the registers $171_1$ through $171_N$ making up the shift register 171 can be performed by making up the shift register 171 with a sufficient number of registers, and operating the N registers, wherein the number N matches the reference bit length N which is a variable value, as registers $171_1$ through $171_N$.

The error determining unit 172 references the error rate table stored in the table storing unit 155 (FIG. 7), and searches (a received bit string matching) the received bit string of reference bit length N made up with the shift register 171 from the error rate table thereof.

In the case that a received bit string, which is a received bit string of reference bit length N made up in the shift register 171 and is correlated to an error rate of 1.0, exists in the error rate table, the error determining unit 172 determines that the last one bit (MSB) (bit of interest latched in the register $171_1$) which is the post-data of the received bit string thereof is in error, and supplies the error determination result thereof to the correcting unit 173.

Also, in the case that a received bit string, which is a received bit string of reference bit length N made up in the shift register 171 and is correlated to an error rate of 1.0, does not exist in the error rate table, the error determining unit 172 determines that the last one bit which is the post-data of the received bit string thereof is not in error, and supplies the error determination result thereof to the correcting unit 173.

The last one bit (bit of interest latched in the register $171_1$) which is the post-data of the received bit string of reference bit length N, which is made up in the shift register 171, is supplied to the correcting unit 173 from the selector 152 (FIG. 7). The correcting unit 173 outputs the post-data from the selector 152 without change, or corrects into the correct value, according to the determination result of the error from the error determining unit 172.

Next, processing performed by the transmission processing unit 101 in FIG. 7 (transmission processing) will be described with reference to the flowchart in FIG. 11.

With the transmission processing unit 101, the transmission processing is started when image data in the format shown in FIG. 8 is supplied from the signal processing unit 103 (FIG. 4) to the selector 132 (FIG. 7), for example.

In step S111, as described above, the selector 132 detects EAV and SAV from the image data from the signal processing unit 103 (FIG. 4), and determines whether or not the image data from the signal processing unit 103 is image data in a valid image period.

In the case that the image data from the signal processing unit 103 is determined to be image data in the valid image period in step S111, the processing is advanced to step S112, the selector 132 selects image data (pixel data) (includes EAV and SAV) from the signal processing unit 103, and supplies this to the wireless signal transmission unit 133, and the processing is advanced to step S113.

In this case, in step S113, the wireless signal transmission unit 133 modulates the transmitted bit string serving as image data from the selector 132 into an RF signal, and transmits this via the antenna 37a, and the processing is returned to step S111.

Also, in the case that the image data from the signal processing unit 103 is determined not to be image data in a valid image period in step S111, the processing is advanced to step S114, wherein the test data generating unit 131 generates test data of a predetermined bit length N and supplies this to the selector 132, and the processing is advanced to step S115.

In step S115, the selector 132 selects test data from the test data generating unit 131 and supplies this to the wireless signal transmission unit 133, and the processing is advances to step S113.

In this case, in step S113, the wireless signal transmission unit 133 modulates the test data from the selector 132 into an RF signal and transmits this via the antenna 37a, and the processing is returned to step S111.

Figure 11:
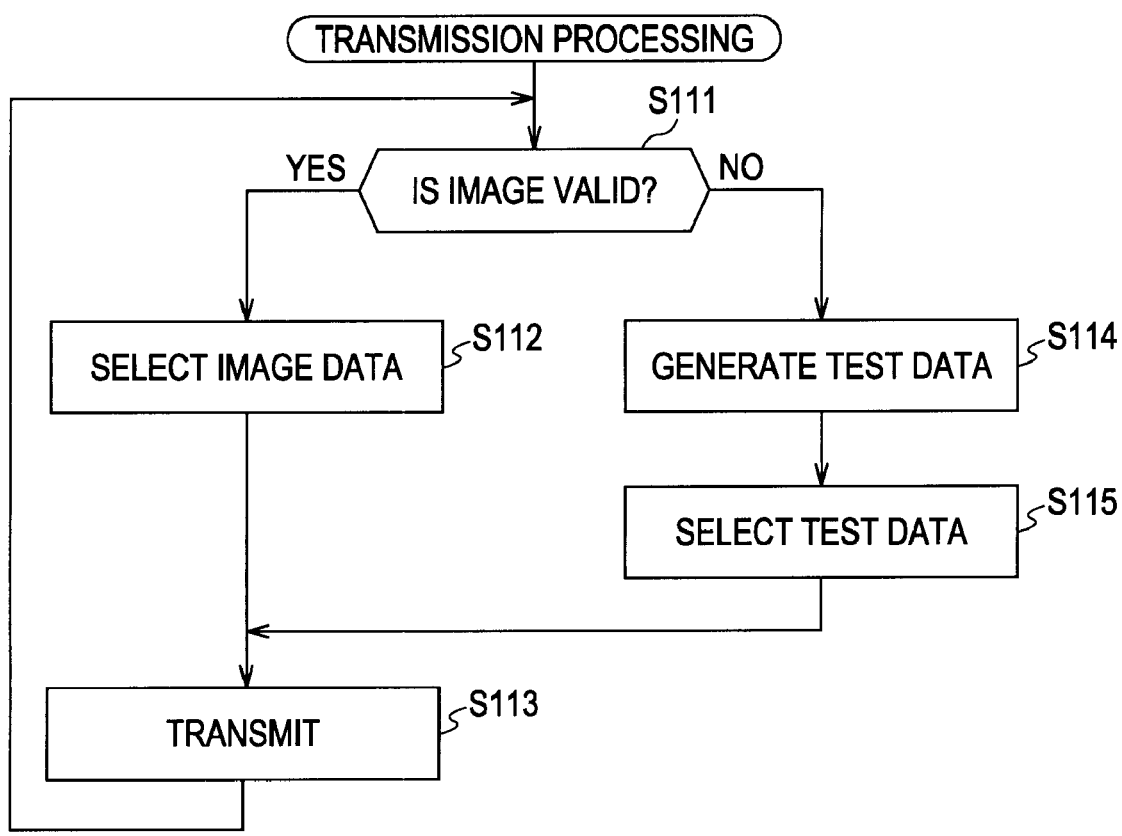
FIG. 11 is a flowchart to describe transmission processing.

Note that the transmission processing in FIG. 11 ends when the image data being supplied from the signal processing unit 103 (FIG. 4) to the selector 132 stops, for example.

Next, processing (reception processing) performed by the reception processing unit 112 in FIG. 7 will be described with reference to FIG. 12.

With the reception processing unit 112, reception processing is started when radio waves above a predetermined intensity is detected by the transmission processing unit 101 starting the transmission processing in FIG. 11, for example.

In step S121, the wireless signal reception unit 151 receives the RF signal transmitted from the transmission processing unit 101 via the antenna 36a and demodulates this to a baseband signal. The wireless signal reception unit 151 then outputs a received bit string corresponding to the transmitted bit string (includes test data) obtained as a result of demodulating, to the selector 152, and the processing is advanced from step S121 to step S122.

In step S122, the selector 152 determines whether or not the received bit string from the wireless signal reception unit 151 is a received bit string corresponding to the image data in a valid image period, similar to the selector 132 (FIG. 7) by detecting the EAV and SAV.

In the case that determination is made in step S122 that the received bit string from the wireless signal reception unit 151 is a received bit string corresponding to the image data in a valid image period, the processing is advanced to step S123, the selector 152 supplies the received bit string corresponding to the image data in a valid image period (transmitted bit string) from the wireless signal reception unit 151 to the error correcting unit 156, and the processing is advanced to step S124.

In step S124, the error correcting unit 156 references the error rate table stored in the table storing unit 155, performs error correcting for the last one bit as the post-data of the received bit string from the selector 152, and supplies the post-data after the error correcting thereof to the signal processing unit 113 (FIG. 4). The processing then is returned to step S121.

On the other hand, in the case that determination is made in step S122 that the received bit string from the wireless signal reception unit 151 is not a received bit string corresponding to the image data in a valid image period, i.e. in the case that the received bit string from the wireless signal reception unit 151 is a received bit string corresponding to test data, the processing is advanced to step S125, the selector 152 supplies the received bit string corresponding to test data from the wireless signal reception unit 151 to the table generating unit 154, and the processing is advanced to step S126.

In step S126, the tale creating unit 154 compares the received bit string corresponding to test data supplied from the selector 152 and test data supplied from the test data generating unit 153, i.e. the correct values of the received bit string supplied from the selector 152, thereby determining the error of the post-data of the received bit string from the selector 152, and based on the determination results thereof, finds the error rate wherein the post-data is in error, and thus creates the error rate table wherein the received bit strings of various patterns and the error rate of the post-data of the received bit strings being in error are correlated.

The table generating unit 154 supplies the error rate table to the table storing unit 155, and the processing is returned from step S126 to step S121.

Next, the processing for error correcting (error correcting processing) performed by the error correcting unit 156 in step S124 in FIG. 12 will be described with reference to the flowchart in FIG. 13.

Figure 12:
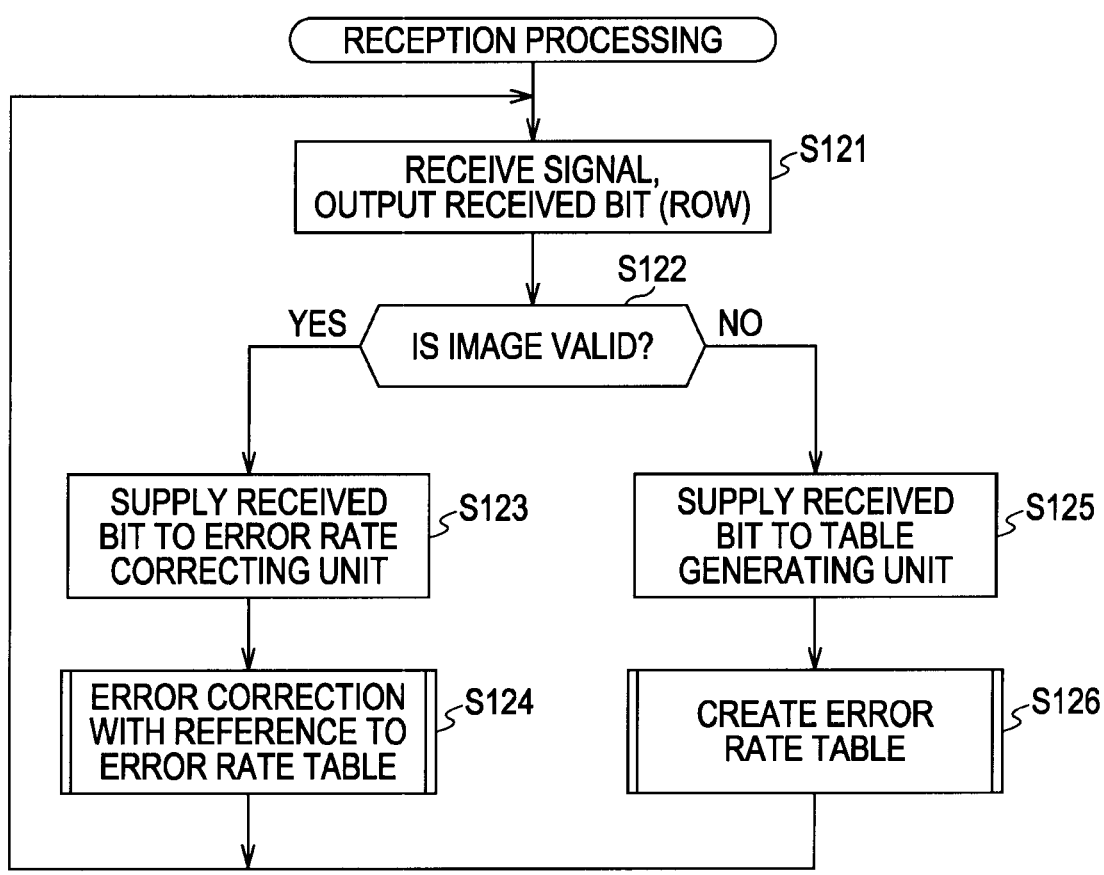
FIG. 12 is a flowchart to describe reception processing.
Figure 13:
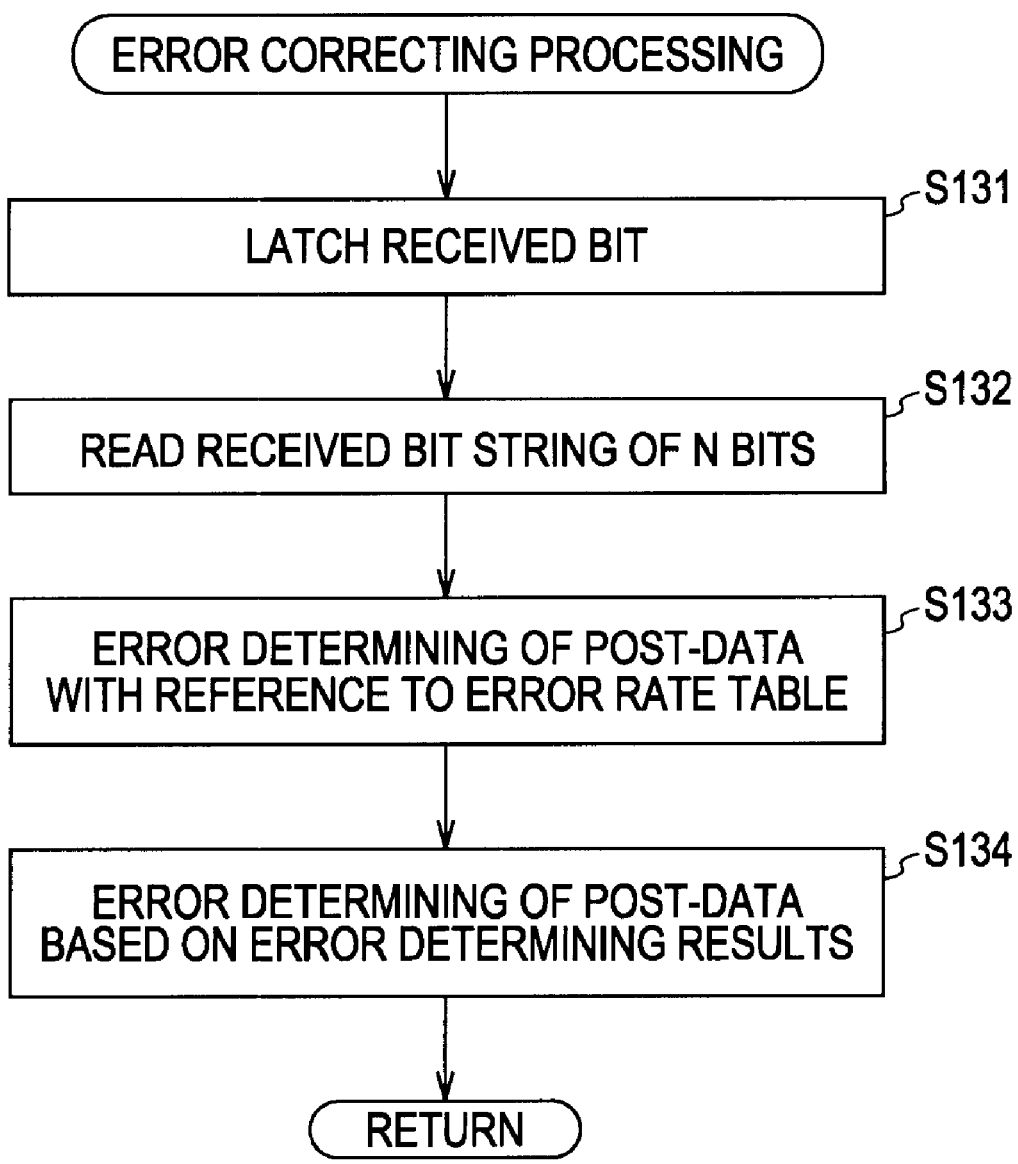
FIG. 13 is a flowchart to describe error correcting processing.

With the error correcting unit 156 (FIG. 10), in step S123 in FIG. 12, the received bit string corresponding to the image data in a valid image period which is supplied from the selector 152 (FIG. 7) is supplied to the shift register 171 and correcting unit 173 in increments of one bit, for example, in received order.

In step S131, the shift register 171 and correcting unit 173 latch the newest one bit of the received bit string supplied from the selector 152 as the bit of interest, and the processing is advanced to step S132.

Note that in step S131, with the shift register 171, the leading register $171_1$ latches the bit of interest, while each of the registers $171_n$ from the second to the N'th register latches the one bit which the register $171_{n-1}$ upstream therefrom has latched, whereby a received bit string of reference bit length N is configured.

In step S132, the error determining unit 172 reads the received bit string of reference bit length N made up in the immediately previous step S131 from the shift register 171, and the processing is advanced to step S133.

In step S133, the error determining unit 172 references the error rate table stored in the table storing unit 155 (FIG. 7), and determines whether or not there is any error in the post-data (here this is also a bit of interest) of the received bit string of reference bit length N which is red from the shift register 171.

The error determining unit 172 supplies the determination results of whether there is any error in the post-data to the correcting unit 173.

That is to say, in the case that a received bit string, which is a received bit string of reference bit length N read from the shift register 171 and is correlated to an error rate of 1.0, exists in the error rate table, the error determining unit 172 determines that the post-data of the received bit string thereof is in error, and supplies the error determination result thereof to the correcting unit 173.

Also, in the case that a received bit string, which is a received bit string of reference bit length N read from the shift register 171 and is correlated to an error rate of 1.0, does not exist in the error rate table, the error determining unit 172 determines that the post-data of the received bit string thereof is not in error, and supplies the error determination result thereof to the correcting unit 173.

Thereafter, the processing is advanced from step S133 to step S134, and the correcting unit 173 performs error correcting for the bit of interest supplied from the selector 152 (FIG. 7), i.e. the post-data of the received bit string of reference bit length N which is made up in the shift register 171, and outputs the error correcting results thereof to the signal processing unit 113 (FIG. 4). The processing is then returned.

That is to say, in the case that the error determination results from the error determining unit 172 indicates that there is no error to the post-data, the correcting unit 173 outputs the post-data without change as error correcting results.

Also, in the case that the error determination results from the error determining unit 172 indicates that there is error in the post-data, the correcting unit 173 corrects the post-data to the correct values, and outputs the correct values thereof as the error correcting results.

For example, as shown in FIG. 9, in the case that a received bit string "0000 1000 0001 0110 1010 0011" (decimal numeral of "530083") with an error rate of 1.0 is registered in the error rate table, in the case that a received bit string "0000 1000 0001 0110 1010 0011" (decimal numeral of "530083") is made up in the shift register 171, the last one bit (MSB) "0" which is the post-data of the received bit string thereof is in error. Therefore, the error correcting unit 156 error-corrects the bit "0" which is the post-data thereof to the correct value of "1" and outputs this.

Next, processing to create an error rate table (error rate table creating processing) performed in step S126 in FIG. 12 will be described with reference to the flowchart in FIG. 14.

With the error rate table creating processing, under control of a control signal from the control unit 114 (FIG. 4), the test data generated unit 153 of the received processing unit 112 generates the same test data as the test data generated by the test data generating unit 131 of the transmission processing unit 101, and supplies this to the table generating unit 154.

In step S141, the table generating unit 154 compares the received bit string corresponding to the test data supplied from the selector 152 (FIG. 7) in step S125 in FIG. 12 and generated with the test data generating unit 131 (FIG. 7) and the test data supplied from the test data generating unit 153, i.e. the correct values of the received bit string supplied from the selector 152, and determines any error of the last one bit which is the post-data of the received bit string from the selector 152 (newest one bit). The processing is then advanced to step S142.

In step S142, based on the error determination results from the immediately preceding step S141, the table generating unit 154 finds the error rate of the post-data from the received bit string supplied from the selector 152, and the processing is advanced to step S143.

That is to say, the table generating unit 154 has a working memory built therein which stores data temporarily, and the occurrence frequency of the received bit strings supplied from the selector 152 and the number of times of errors that the post-data of the received bit strings thereof have been in error are stored therein.

The table generating unit 154 increments the occurrence frequency of the received bit strings supplied from the selector 152 of the occurrence frequencies stored in the working memory by 1, and further, in step S141, in the case determination is made that there is any error to the post-data of the received bit string supplied from the selector 152, increments the number of times of errors with the received bit strings supplied from the selector 152 of the number of times of errors stored in the working memory by 1.

The table generating unit 154 divides the number of times of errors regarding the received bit strings supplied from the selector 152, of the number of times of errors stored in the working memory, by the occurrence frequency of the received bit strings supplied from the selector 152, of the occurrence frequency stored in the working memory, whereby the error rate for the received bit strings supplied from the selector 152 (the error rate of the post-data of the received bit strings supplied from the selector 152) is obtained.

Note that the number of times of occurrence of the working memory of the table generating unit 154 and the error rate are cleared when initialization of the error rate table stored in the table storing unit 155 is performed.

Initialization of the error rate table is performed in the case that changes occur to the communication environment within the casing 32, such as change to the form of the casing 32 (FIG. 2), changes to the positions of the boards 34 through 37 within the casing 32, changes to the positions of the antennas 35*a* through 37*a* and 50*a*, and so forth, in the case that the user performs operations so as to perform initialization, in the case that the power source is first turned on after purchasing the signal processing device 31, in the case that the system control block 50 issues a setting start command to be described later, and so forth.

In step S143, the table generating unit 154 reads the error rate table stored in the table storing unit 155, and newly creates an error rate table reflecting the error rates obtained in the immediately preceding step S142. The processing is then advanced to step S144.

In step S144, the table generating unit 154 writes new error rate table created in step S143 so as to overwrite on the table storing unit 155, and the processing is returned.

Note that the influence that multipath phasing which occurs within the casing 32 has on the wireless communication within the casing 32 differs by communication environments such as the configuration (form) or materials of the casing 32, the positions of the boards 34 through 37, and the positions of the antennas 35*a* through 37*a* and 50*a*.

Also, the power of the radio waves decays inversely proportional to the square of the path length of the radio waves, and the multipath occurring within the casing 32 (the radio wave path arriving at a delay (delayed waves)) is fixed as long as the communication environment within the casing 32 such as the positions of the boards 34 through 37 within the casing 32 or the form of the casing 32 (the positions of the wall faces and so forth) do not change, whereby influence from interference from delayed waves become routine. In other words, influence from the interference from the delayed waves differs for every communication environment.

Figure 14:
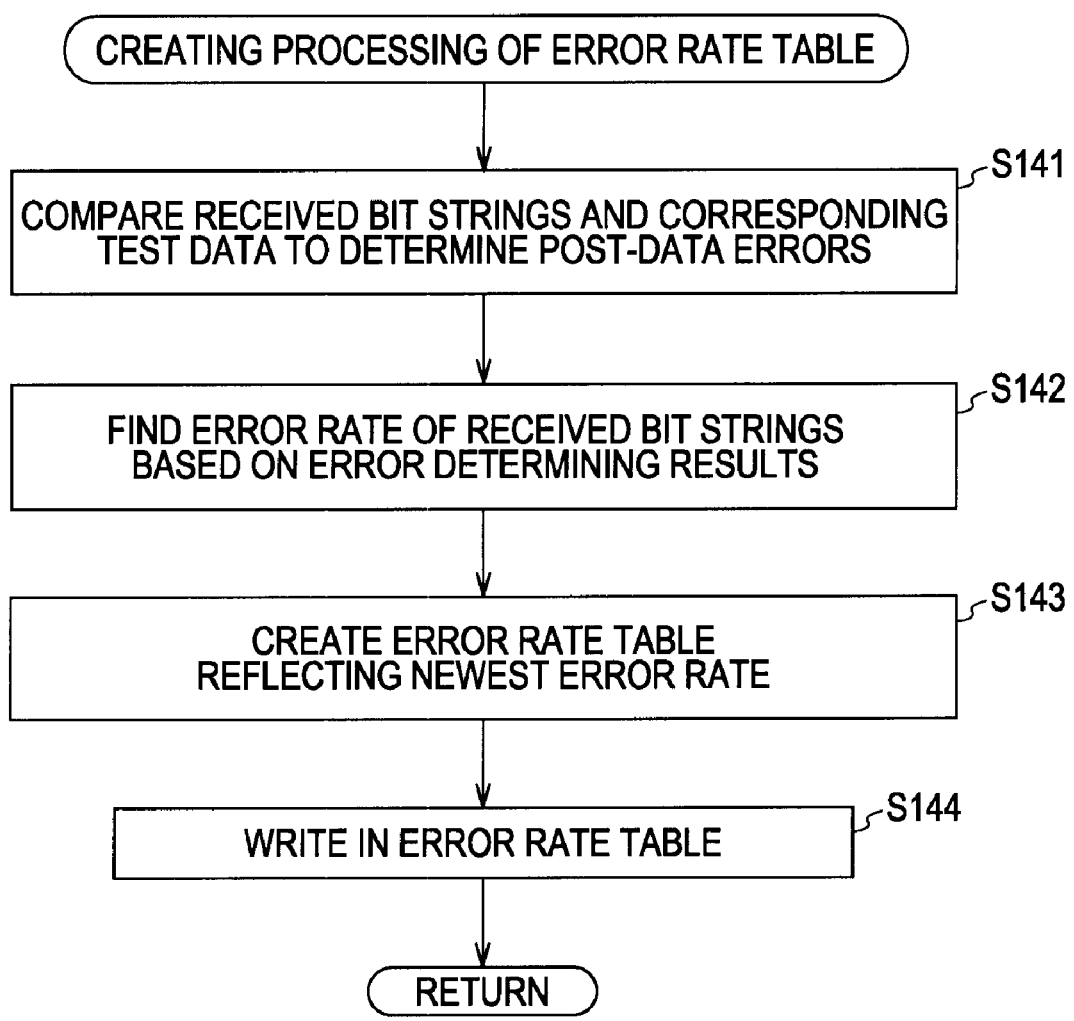
FIG. 14 is a flowchart to describe error rate table creating processing.

On the other hand, for example, in the case that the bit length of the test data transmitted from the transmission processing unit 101 is changed from a small value to a large value and the test data of bit lengths for each value are used to perform creating processing of the error rate table in FIG. 14, as the number of received bit strings with an error rate of 1.0 (100) gradually increases and the bit length of the test data becomes a certain value, even if the bit length of test data is made greater than such value, the number of received bit strings with an error rate of 1.0 no longer increases.

Accordingly, if we say that (the minimum value of) the bit length of the test data when the number of received bit strings with an error rate of 1.0 no longer increases is an optimal bit length of test data, as to the signal of a certain bit of interest, the delayed waves of the bit signal transmitted earlier than the bit of interest by an optimal bit length gives almost no influence (interference) to the signal of the bit of interest. Note that the optimal bit length of test data differs by communication environment.

The processing to find the optimal bit length of test data (setting processing for optimal bit length) will be described. Note that in the case that optimal bit length setting processing is performed, the optimal bit length obtained by such optimal bit length setting processing becomes the above-described reference bit length, i.e. the bit length for the received bit string registered in the error rate table.

The optimal bit length setting processing is performed with the system control block 50 (FIG. 3), signal router 45 serving as a transmission device, and function block 46 serving as a reception device. The optimal bit length setting processing which the system control block 50 performs will be described with reference to the flowchart in FIG. 15.

The system control block 50 performs optimal bit length setting processing at the time of the power source of the signal processing device 31 first being turn on, for example, and in order to shorten the startup time, as a rule optimal bit length setting processing is not performed when the power is turned on thereafter.

However, in the case that the user has performed an operation to perform initialization, or in the case that a communication environment within the casing 32 has changed such as changes to the positions of the boards 34 through 37 within the casing 32, the system control block 50 performs optimal bit length setting processing, for example, at the next time the power of the signal processing device 31 is turned on.

In step S151, the system control block 50 issues a command to request the start of optimal bit length setting processing (hereafter called setting starting command, as appropriate), and transmits this via the antenna 50a (FIG. 3), and the processing is advanced to step S152.

In step S152, the system control block 50 determines the test data bit length at a predetermined value. Further, in step S152, the system control block 50 issues a command to specify the test data bit length as a predetermined value (hereafter called specifying command, as appropriate), and transmits this via the antenna 50a, and the processing is advanced to step S153.

In step S153, the system control block 50 determines whether or not a command to request re-specifying the test data bit length (hereafter called request command, as appropriate) has been transmitted from the function block 46 serving as the reception device.

In the case that determination is made in step S153 that a request command has been transmitted from the function block 46 serving as the reception device, i.e. in the case that the system control block 50 receives a request command transmitted from the function block 46 serving as the reception device, the processing is returned to step S152, and the system control block 50 determines the test data bit length to be a value greater than the value determined in the previous step S152 (e.g. a value greater by only one bit and so forth), and hereafter similar processing is repeated.

Note that with the system control block 50, upon optimal bit length setting processing starting, when the processing in step S152 is first performed, the test data bit length is determined to be a predetermined initialization value (e.g. two bits or the like).

On the other hand, in the case that determination is made in step S153 that a request command has not been transmitted from the function block 46 serving as the reception device, i.e. in the case that a request command is not received even after the specifying command is transmitted in the immediately previous step S152 and a predetermined amount of time has passed, i.e. in the case that the function block 46 serving as the reception device has not transmitted a request command, the processing is advanced to step S154, the system control block 50 issues a command to request start of image communication (hereafter called communication starting command, as appropriate), and this is transmitted via the antenna 50a and the processing is ended.

Now, upon the signal router 45 serving as the transmission device receiving the communication starting command from the system control block 50, the state thereof becomes such that the transmission processing in FIG. 11 can be performed. Also, upon the function block 46 serving as the reception device receiving the communication starting command from the system control block 50, the state thereof becomes such that the reception processing in FIG. 12 can be performed.

Next, optimal bit length setting processing which is performed by the signal router 45 serving as the transmission device will be described with reference to FIG. 16.

Figure 15:
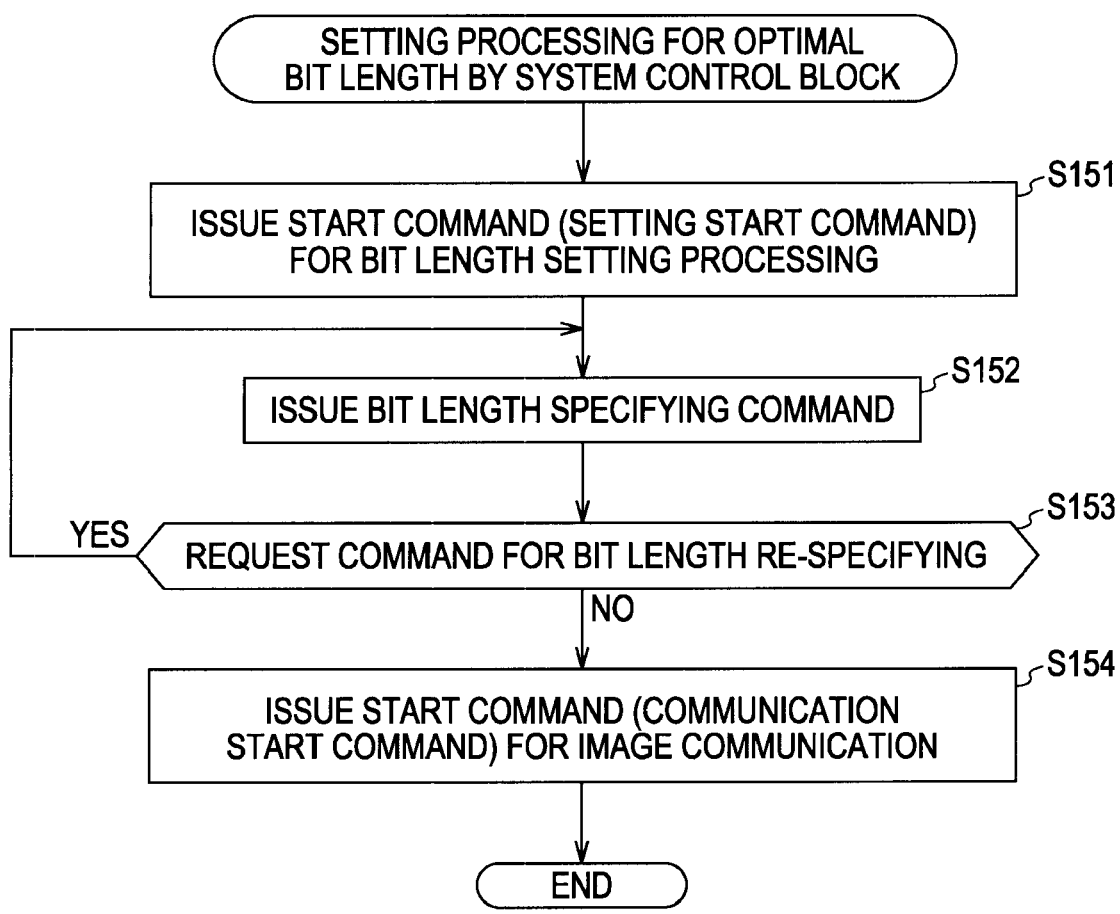
FIG. 15 is a flowchart to describe setting processing for the optimal bit length which is performed by a system control block 50.

Upon the system control block 50 receiving the setting starting command transmitted in step S151 in FIG. 15, the signal router 45 starts the optimal bit length setting processing.

In step S161, with the signal router 45 (FIG. 4), the reception processing unit 102 awaits and receives the specifying command transmitted from the system control block 50 in step S152 in FIG. 15, and supplies this to the control unit 104.

Further, in step S161, according to the specifying command from the reception processing unit 102, the control unit 104 (FIG. 4) temporarily sets the test data bit length to the value specified by the specifying command, and controls the test data generating unit 131 of the transmission processing unit 101 (FIG. 7) so as to generate test data of such bit length, and the processing is advanced to step S162.

In step S162, the test data generating unit 131 of the transmission processing unit 101 (FIG. 7) generates test data of a bit length according to the control by the control unit 104 and supplies this to the selector 132, and the processing is advanced to step S163.

In step S163, the selector 132 selects test data from the test data generating unit 131 and supplies this to the wireless signal transmission unit 133, and the processing is advanced to step S164.

In step S164, the wireless signal transmission unit 133 modulates the test data from the selector 132 into an RF signal and transmits this via the antenna 37a, and the processing is advanced to step S165.

In step S165, the test data generating unit 131 determines whether or not transmission is performed for all of the patterns of the test data of the bit length according to control by the control unit 104 a predetermined number of times (the number of times necessary for finding a statistically reliable error rate with the function block 46 serving as the reception device, for example).

In the event determination is made in step S165 that transmission for all of the patterns of the test data of the bit length according to control by the control unit 104 has not yet been performed a predetermined number of times, the processing is returned to step S162, where test data of a pattern which is the same as or different from the previous time of the bit length according to control by the control unit 104 is generated with the test data generating unit 131 (FIG. 7), and thereafter similar processing is repeated.

Also, in the event determination is made in step S165 that transmission for all of the patterns of the test data of the bit length according to control by the control unit 104 has been performed a predetermined number of times, the processing is advanced to step S166, the control unit 104 (FIG. 4) determines whether or not a request command, i.e. a command to request re-specifying of the test data bit length is transmitted from the function block 46 serving as the reception device.

In the event determination is made in step S166 that a request command is transmitted from the function block 46 serving as the reception device, i.e. in the case a request command transmitted from the function block 46 serving as the reception device is received at the reception processing unit 102 (FIG. 4) and supplied to the control unit 104, the processing is returned to step S161, the reception processing unit 102 awaits and receives transmission of a new specifying command from the system control block 50 in step S152 in FIG. 15, and thereafter similar processing is repeated.

On the other hand, in the event determination is made in step S166 that a request command has not been transmitted from the function block 46 serving as the reception device, i.e. in the case a request command was not received even after a predetermined amount or time has passed after transmission for all of the patterns of the test data of a bit length according to control by the control unit 104 is performed a predetermined number of times, i.e. in the case the function block 46 serving as the reception device did not transmit the request command, the processing is advanced to step S167, the test data generating unit 131 (FIG. 7) sets (determines) the bit length temporarily set in the immediately preceding step S161 to the test data bit length, and the processing is advanced to step S168. Hereafter, test data of the bit length set in step S167 is generated in the test data generating unit 131.

In step S168, the reception processing unit 102 (FIG. 4) awaits and receives the communication starting command to be transmitted from the system control block 50 in step S154 in FIG. 15, and the processing is ended.

Figure 17:
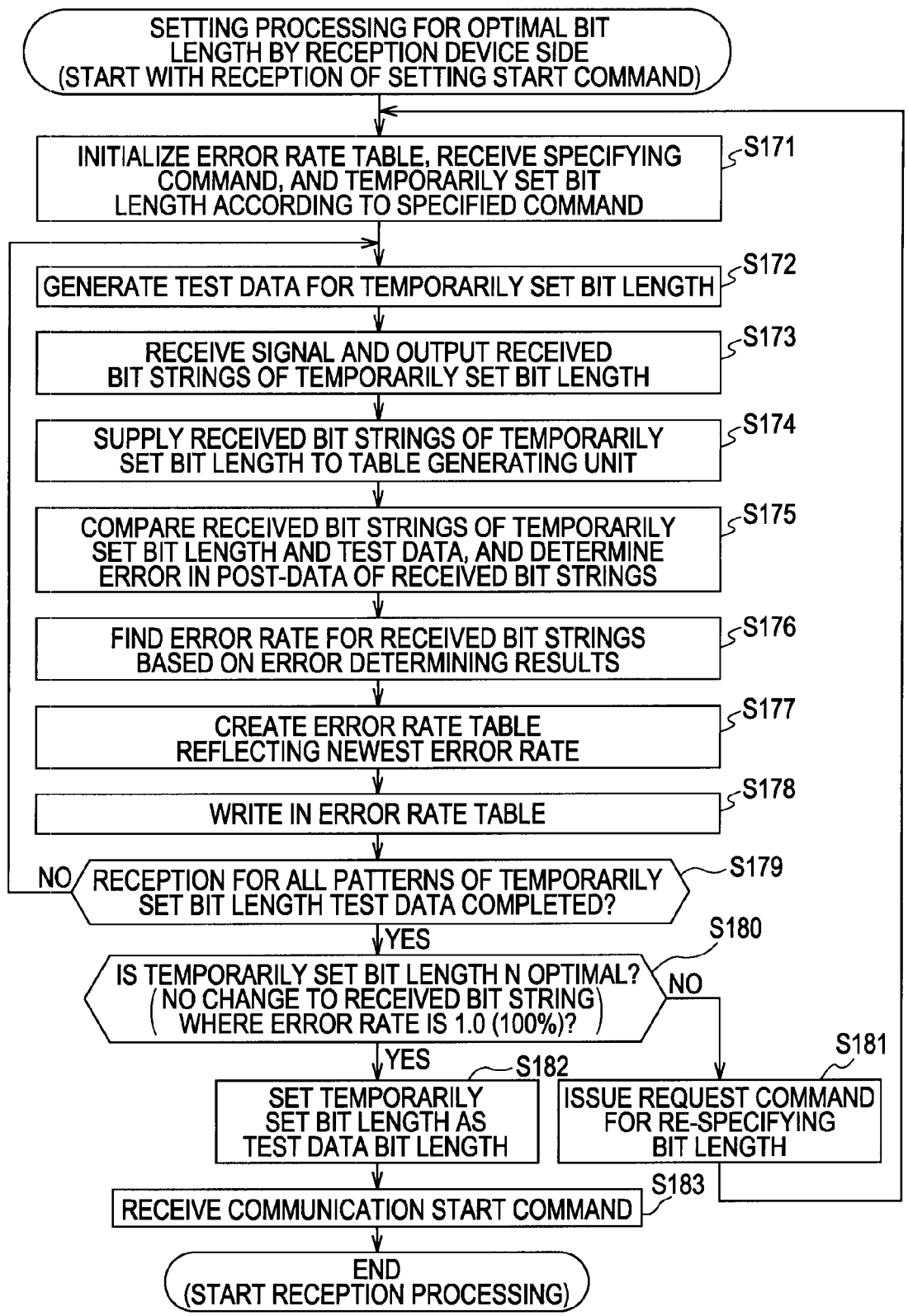
FIG. 17 is a flowchart to describe setting processing for the optimal bit length which is performed by the function block 46 serving as a reception device.

Next, optimal bit length setting processing which the function block 46 serving as the reception device performs will be described with reference to FIG. 17.

Upon receiving the setting starting command transmitted by the system control block 50 in step S151 in FIG. 15, the function block 46 starts the optimal bit length setting processing.

In step S171, at the function block 46 initialization (clearing) of the error rate table stored in the table storing unit 155 of the reception processing unit 112 (FIG. 7) is performed.

Also, in step S171, the reception processing unit 112 awaits and receives the specifying command to be transmitted from the system control block 50 in step S152 in FIG. 15, and supplies this to the control unit 114.

Further, in step S171, according to the specifying command from the reception processing unit 112, the control unit 114 (FIG. 4) temporarily sets the test data bit length to a value specified by the specifying command thereof, and controls the test data generating unit 153 of the reception processing unit 112 (FIG. 7) so as to generate the test data of such bit length, and the processing is advanced to step S172.

Figure 16:
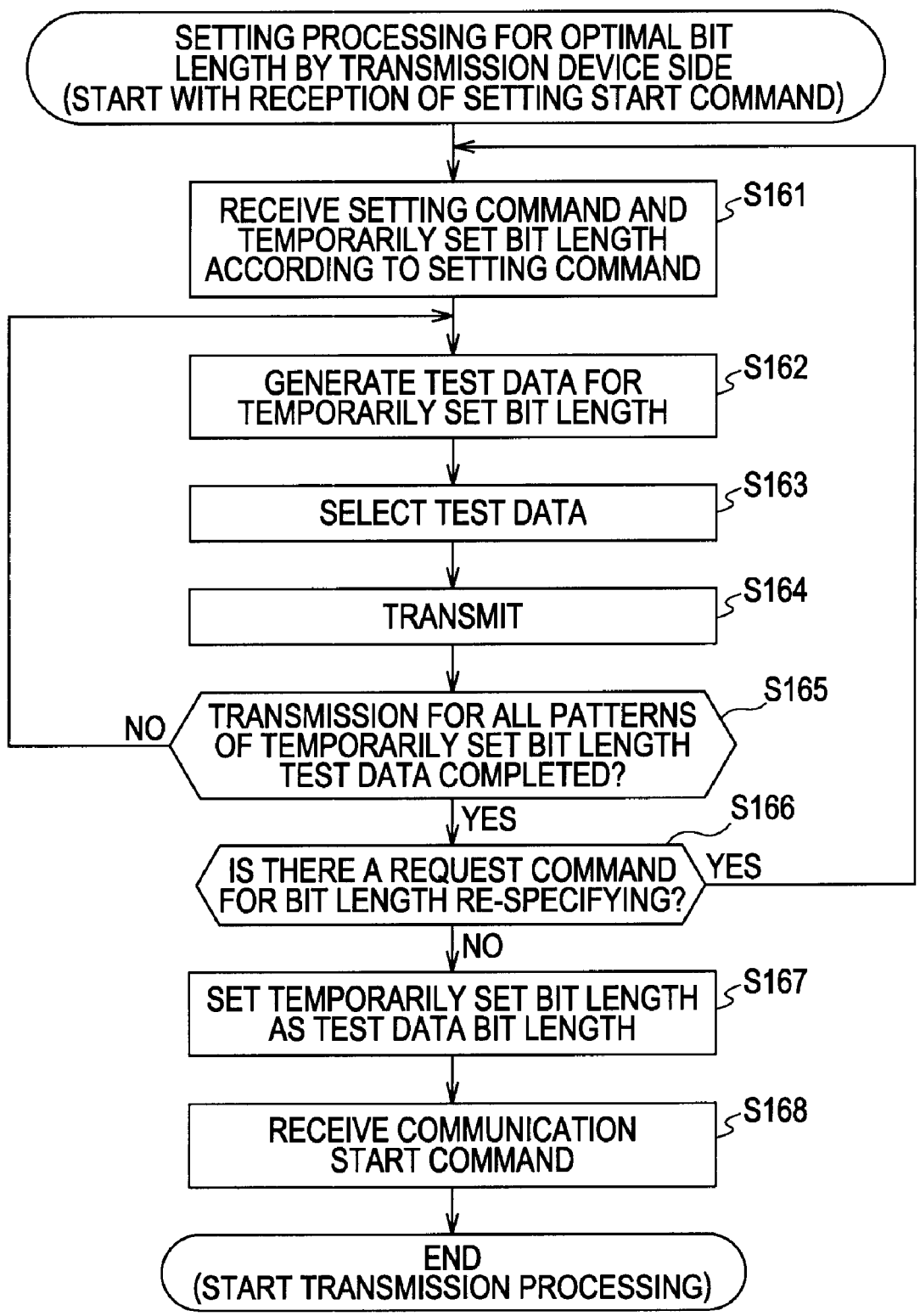
FIG. 16 is a flowchart to describe setting processing for the optimal bit length which is performed by the signal router 45 serving as a transmission device.

In step S172, the test data generating unit 153 of the reception processing unit 112 (FIG. 7) generates test data of the bit length according to control by the control unit 114, which is the same test data which the test data generating unit 131 of the transmission processing unit 101 with the signal router 45 serving as the transmission device generates in step S162 in FIG. 16, supplies this to the table generating unit 154 (FIG. 7), and the processing is advanced to step S173.

In step S173, the wireless signal reception unit 151 (FIG. 7) awaits the RF signal of the test data of a temporarily set bit length to be transmitted in step S164 in FIG. 16 from the transmission processing unit 101 (FIG. 7) with the signal router 45 serving as the transmission device, receives such RF signal via the antenna 36*a*, and demodulates this into a baseband signal. The wireless signal reception unit 151 outputs the received bit string corresponding to the test data which is obtained as a result of demodulation to the selector 152, and the processing is advanced from step S173 to step S174.

In step S174, the selector 152 supplies the received bit string corresponding to test data from the wireless signal reception unit 151 to the table generating unit 154, and the processing is advanced to step S175.

In step S175, the table generating unit 154 compares the received bit string corresponding to the test data from the selector 152 (FIG. 7) and the test data supplied from the test data generating unit 153 in step S172, i.e. the correct values of the received bit string supplied from the selector 152, determines any error in the last one bit which is the post-data of the received bit string from the selector 152, and the processing is advanced to step S176.

In step S176, the table generating unit 154 finds the error rate of the post-data from the received bit string corresponding to the test data from the selector 152, based on the error determining results in the immediately preceding step S175, similar to step S142 in FIG. 14, and the processing is advanced to step S177.

In step S177, the table generating unit 154 reads the error rate table stored in the table storing unit 155, an error rate table reflecting the error rate obtained in the immediately preceding step S176 is created in the error rate table thereof, and the processing is advanced to step S178.

In step S178, the table generating unit 154 writes a new error rate table created in step S177 so as to overwrite on the table storing unit 155, and the processing is advanced to step S179.

In step S179, the table generating unit 154 determines whether or not reception of all of the patterns of test data of the bit length temporarily set in the preceding step S171 is performed the same number of times as a predetermined number of times (the predetermined number of times in the determination performed in step S165 in FIG. 16).

In the case determination is made in step S179 that reception of all of the patterns of the test data of the bit length temporarily set in the preceding step S171 is not yet performed the predetermined number of times, the processing is returned to step S172, and hereafter similar processing is repeated.

Also, in the case determination is made in step S179 that reception of all of the patterns of the test data of the bit length temporarily set in the preceding step S171 has been performed the predetermined number of times, the processing is advanced to step S180, and the control unit 114 (FIG. 4) determines whether or not the bit length temporarily set in the preceding step S171 (hereafter called temporarily set bit length, as appropriate) is optimal, based on the error rate table stored in the table storing unit 155.

In step S180, depending on whether the distribution of received bit strings with a post-data error rate of 1.0 in the error rate table created as to the temporarily set bit length this time is not changed from the distribution of received bit strings with a post-data error rate of 1.0 in the error rate table created as to the temporarily set bit length last time, determination is made as to whether the temporarily set bit length this time is optimal.

That is to say, for example, if we say that the temporarily set bit length last time is M bits, and the temporarily set bit length this time is M+1 bits, in the case that the received bit string of M bits with a post-data error rate of 1.0 in the error rate table created as to the temporarily set bit length M last time and the upper M bits (bit string corresponding to the received bit string with a temporarily set bit length M last time) of the received bit string of M+1 bits with a post-data error rate of 1.0 in the error rate table created as to the temporarily set bit length M+1 this time are matching, determination is made that the temporarily set bit length this time is optimal, and in the case of not matching, determination is made that the temporarily set bit length this time is not optimal.

In the case determination is made in step S180 that the temporarily set bit length is not optimal, the processing is advanced to step S181, the control unit 114 (FIG. 4) controls the transmission processing unit 111 so as to transmit a command to request re-specifying of the test data bit length (request command), and the processing is returned to step S171.

Thus, the transmission processing unit 111 of the function block 46 (FIG. 4) serving as the reception device transmits the request command via the antenna 36a.

The request command herein is received by the system control block 50 (FIG. 3) in step S153 in FIG. 15, as described above, and is also received by the signal router 45 serving as the transmission device in step S166 in FIG. 16.

On the other hand, in the case determination is made in step S180 that the temporarily set bit length is optimal, the processing is advanced to step S182, and the test data generating unit 153 (FIG. 7) sets the optimal temporarily set bit length thereof (temporarily set bit length this time) as the test data bit length, while the error correcting unit 156 (FIG. 10) sets the number N of the registers $171_1$ through $171_N$ making up the shift register 171 as a number matching the optimal temporarily set bit length, and the processing is advanced to step S183. Hereafter, test data of the bit length set in step S182 is generated in the test data generating unit 153.

In step S183, the reception processing unit 112 (FIG. 4) awaits and receives the communication starting command transmitted from the system control block 50 in step S154 in FIG. 15, and the processing is ended.

As described above, with the function block 46 serving as the reception device, the signal of the test data which is a known transmitted bit string transmitted from the signal router 45 serving as the transmission device which transmits a bit string is received, the received bit string corresponding to test data is output, and the received bit string and the test data generated by the test data generating unit 153 is compared, whereby errors of the post-data which is data of one bit or greater received and the end of the received bit string is determined, and based on the determination results thereof, the error rate that the post-data of the received bit string is in error is obtained, whereby an error rate table correlating the received bit string and the error rate that the post data of the received bit string thereof is in error is created, and therefore regardless of the shape of the casing 32, the positions of the boards 34 through 37 within the casing 32, or the positions of the antennas 35a through 37a and 50a, routine ways of the post-data being in error which results from multipath phasing occurring with wireless communication within the casing 32 (error features) can be captured as an error rate table.

According to the error rate table, the occurrence of error with the received bit received at the point in time from the received bit row received in the past is predicted (estimated), enabling the error thereof to be corrected.

That is to say, with the function block 46 serving as the received device, error correcting for the post-data of the received bit string corresponding to the transmitted bit string obtained by receiving a signal from the signal router 45 can be readily performed by referencing the error rate table, i.e. routine errors of post-data resulting from a multipath can be readily corrected. Consequently, communication quality of the wireless communication path within the casing 32 can be improved equivalently.

Also, by performing wireless communication with radio waves, there are no restrictions on the positioning of the boards and so forth as with the case of performing proximity non-contact communication using a magnetic field or static coupling or the like, so the margin of positioning of the boards at the time of manufacturing the device is increased.

Further, by transmitting test data at a timing of the blanking data in the image data and creating an error table, an error table applicable to the communication environment within the casing 32 at the time thereof can be obtained, whereby changes to the communication environment by deforming (distortion) and so forth of the casing 32 from declining over time can be handled.

Also, with the signal router 45 serving as the transmission device, the bit length of the test data is increased while repeating transmission of the test data, and on the other hand with the function block 46 serving as the reception device, the test data being received, the received bit string being output, errors of the post-data of the received bit string being determined, and the error rate of the post-data of the received bit string in error being obtained based on such determination results are repeated until the received bit string with the post-data error rate of 1.0 no longer changes, and an error rate table is created which correlates the received bit string as to the test data of the bit length at the time that the received bit string with a post-data error rate of 1.0 no longer changes and the error rate, whereby an error rate table can be obtained which correlates the received bit string as to the test data with a bit length optimal for the communication environment and the error rate.

Now, the series of processing described above can be performed with hardware, or can be performed with software. In the case of performing the series of processing with software, a program configuring the software is installed on a general-use computer or the like.

Figure 18:
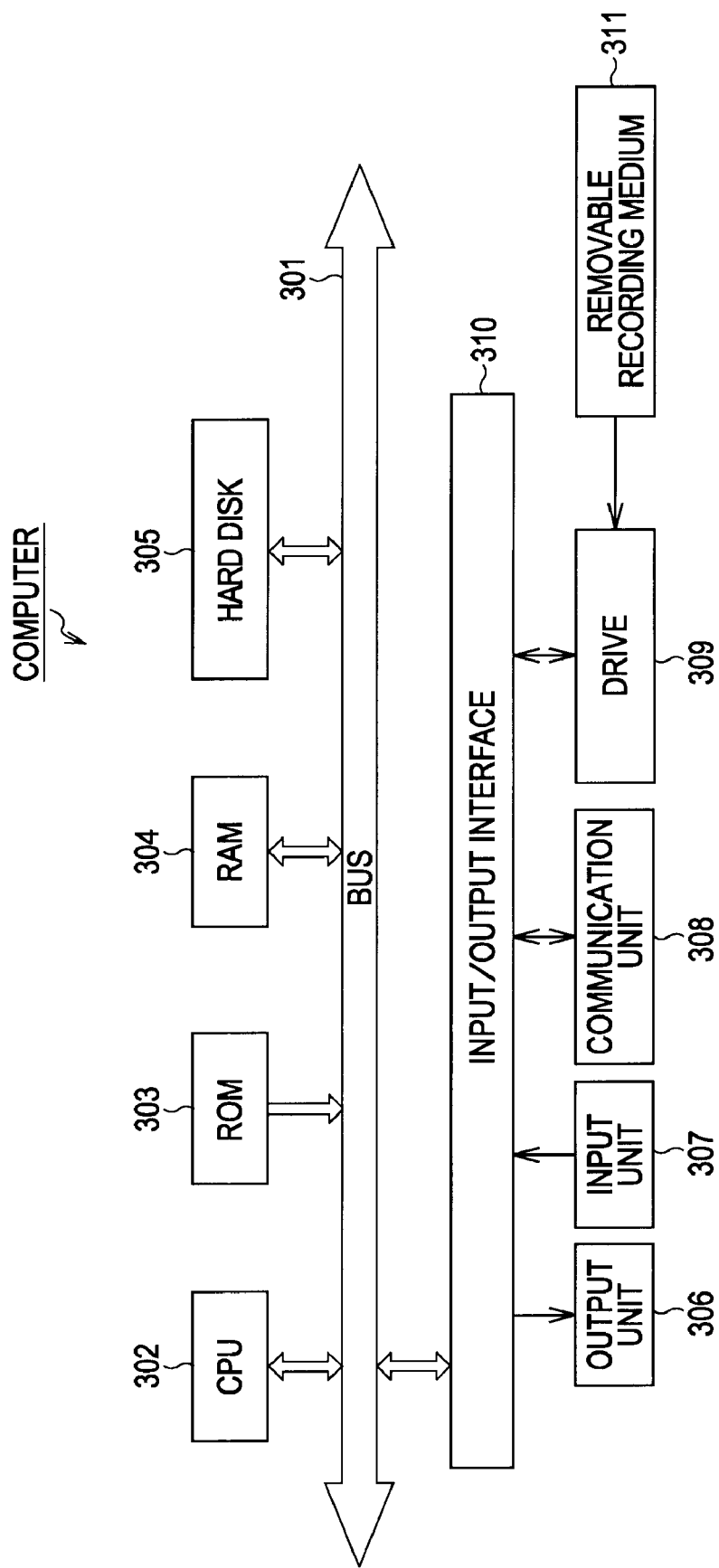
FIG. 18 is a block diagram illustrating a configuration example according to an embodiment of a computer to which the present invention is applied.

FIG. 18 shows a configuration example of an embodiment of a computer whereupon a program is installed to execute the above-described series of processing. The program can be stored beforehand on a hard disk 305 or ROM 303 serving as a recording medium built in the computer. Alternatively, the program can be stored (recorded) temporarily or permanently on a removable recording medium 311 such as a flexible disk, CD-ROM (Compact Disc Read Only Memory), MO (Magneto-Optical) disk, DVD (Digital Versatile Disc), magnetic disk, semiconductor memory, or the like. Such removable recording medium 311 can be provided as so-called packaged software.

Note that other than installing the program from the removable recording medium 311 as described above to a computer, the program can be wirelessly transferred from a download site to the computer via an artificial satellite for digital satellite broadcasts, or transferred by cable to the computer via a network such as a LAN (Local Area Network) or the Internet, and the computer receives the program thus transferred at the communication unit 308, and can install the program onto a hard disk 305 built therein.

The computer has a CPU (Central Processing Unit 302) built therein. The CPU 302 is connected to an input/output interface 310 via a bus 301, and upon a command being input by a user operating an input unit 307 made up of a keyboard, mouse, microphone, and so forth via the input/output interface 310, the CPU 302 executes the program stored in the ROM (Read Only Memory) 303 accordingly. Alternatively, the CPU 302 loads a program stored in the hard disk 305, a program transferred from a satellite or network, a program received in the communication unit 308 and installed in the hard disk 305, or a program read from a removable recording medium 311 mounted on a drive 309 and installed in the hard disk 305, onto a RAM (Random Access Memory) 304 and executes. Thus, the CPU 302 performs the processing according to the above-described flowcharts, or performs the processing performed with the configuration of the block diagrams described above. The CPU 302 then outputs the processing results thereof from an output unit 306 made up of a LCD (Liquid Crystal Display), speaker and so forth, via the input/output interface 310, or transmits from the communication unit 308 and records onto the hard disk 305 or the like, as suitable.

With the present specification, the processing steps describing a program to cause a computer to perform various types of processing are not necessarily restricted to processing in a time-series in the order described as flowcharts, and can include processing executed in parallel or individually (e.g. parallel processing or processing by object).

Also, the program may be processed with one computer, or may be dispersed and processed with multiple computers. Further, the program may be transferred to a remote computer and executed therein.

The present invention has been described as a case applicable to communication performed within the casing 32, but the present invention can be applied to other communication, e.g. a wireless LAN performed in an apartment building or single-family residence, communication via a harness or cable between electronic devices wherein the manner of radio wave reflecting does not change according to time, communication via a communication cable used for telegraph/telephone, fixed wireless communication representative of wireless communication between buildings having no large changes from multipath because the wireless stations are fixed, and other communication wherein the communication environment is constant a certain amount of time and errors occur routinely. By applying the present invention to such communication, routine data errors can be readily corrected in a communication path having multipath interference occurring from the signal transmitted by the transmitting side reflecting or diffracting, or interference occurring from reflecting in a cable, whereby communication quality can be equivalently improved.

Note that the embodiments according to the present invention should not be limited to the above-described embodiments, and various types of modifications can be made within the scope and intent of the present invention.

That is to say, with the present embodiment, the last one bit of the received bit string is described as the post-data, but the post-data can be multiple bits received at the end of the received bit string such as the last one byte of the received bit string, for example.

In the case that the post-data is multiple bits as described above, with the table generating unit 154 (FIG. 7), at the time of creating the error rate table, the error rate that the post-data is in error, and the correct values (can be recognized from the test data supplied from the test data generating unit 153 to the table creating unit 154) of such post-data, should be correlated with the received bit string.

With the error correcting unit 156, in the case that the error rate for the received bit string supplied from the selector 152 is 1.0 with the error rate table, the post-data of the received bit string thereof should be error-corrected to the correct values correlated to the received bit string in the error rate table.

Also, with the present embodiment, with the signal router 45 serving as the transmission device, the transmitted bit string is transmitted without being subjected to error correcting encoding processing, and only errors of post-data of the received bit strings with an error rate of 1.0 (100), which are registered in the error rate table, are corrected with the error correcting unit 156 of the function block 46 serving as a reception device, but an arrangement may be made wherein, with the signal router 45 serving as the transmission device, the transmitted bit string is subjected to error correcting encoding processing, and errors of post-data of the received bit strings with an error rate smaller than 1.0, e.g. a value greater than 0.5 (50), can be corrected with the error correcting unit 156 of the function block 46 serving as a reception device.

In this case, error correcting processing by error correcting coding is performed after the error correcting with the error correcting unit 156, whereby the error rate of data finally obtained can be reduced, the efficiency of error correcting by error correcting coding can be equivalently improved, and communication quality of the wireless communication path can be further improved.

Further, with the present embodiment, with the signal router 45 serving as the transmission device, the test data is transmitted in a period other than the valid image period of the image data, but an arrangement may be made wherein the test data is transmitted during a fixed period immediately following the power of the signal processing device 31 being turned on, for example. Also, the data subjected to transmitting is not restricted to images, and for example may be audio.

It should be understood by those skilled in the art that various modifications, combinations, sub-combinations and alterations may occur depending on design requirements and other factors insofar as they are within the scope of the appended claims or the equivalents thereof.

What is claimed is:

1. A reception device configured to receive a signal of a transmitted bit string transmitted from a transmission device which transmits a bit string, comprising:
   receiving means arranged to receive the signal from said transmission device and output a received bit string corresponding to said transmitted bit string;
   storing means arranged to store an error rate table wherein said received bit string is correlated with an error rate of post-data which is data of one bit or greater received at the end of the received bit string being in error; and
   error correcting means arranged to perform error correcting of said post-data of said received bit string, with reference to said error rate table.

2. The reception device according to claim 1, wherein said error rate table is created by determining the error of said post-data of said received bit string obtained by receiving test data which is a known transmitted bit string transmitted from said transmission device.

3. The reception device according to claim 2 wherein said receiving means receives test data which is a known transmitted bit string transmitted from said transmission device, and outputs a received bit string corresponding to said test data, further comprising:

creating means arranged to create said error rate table by comparing said received bit string and said test data to determine the error of said post-data of said received bit string, and finding the error rate wherein said post-data of said received bit string is in error, based on the determination result thereof.

4. The reception device according to claim 3 wherein said transmission device increasing the bit length of said test data while repeating said test data transmission,
wherein said receiving means receives said test data and outputs said receiving bit string;
wherein said creating means determines the error of said post-data of said receive bit string, finds the error rate of said post-data of said received bit string being in error, based on the determination result thereof, and repeats this until said received bit string with said post-data error rate of 1.0 does not change;
and wherein said storing means stores said error rate table wherein said received bit string as to the test data of the bit length at the time said received bit string with said post-data error rate of 1.0 no longer changes, and said error rate, are correlated.

5. The reception device according to claim 3 wherein said creating means creates said error rate table which correlates said received bit string, the error rate of said post-data errors of said received bit string, and correct values of said post-data in error.

6. The reception device according to claim 1 wherein said error rate table is correlated with said received bit string and the error rate wherein the last one bit received of said received bit string serving as said post-data is in error;
and wherein said error correcting means performs error correction of the last one bit received of said received bit string serving as said post-data.

7. The reception device according to claim 1 wherein said error rate table is correlated with said received bit string, the error rate wherein the last plurality of bits received of said received bit string serving as said post-data is in error, and the correct values of the plurality of bits;
and wherein said error correcting means perform error correcting to correct the last plurality of bits received of said received bit string serving as said post-data to said correct values.

8. A reception method for a reception device arranged to receive a signal of a transmitted bit string transmitted from a transmission device which transmits a bit string, comprising the steps of:
receiving the signal from said transmission device and outputting a received bit string corresponding to said transmitted bit string;
referencing an error rate table which correlates an error rate between said received bit string and an error of post-data which is data of one bit or greater received at the end of the received bit string; and
error correcting of said post-data of said received bit string.

9. A non-transitory computer readable medium having instructions that when executed causes a computer to function as a reception device arranged to receive a signal of a transmitted bit string transmitted from a transmission device which transmits a bit string, comprising:
receiving means arranged to receive the signal from said transmission device and output a received bit string corresponding to said transmitted bit string;
storing means arranged to store an error rate table wherein said received bit string is correlated with an error rate of post-data which is data of one bit or greater received following the received bit string being in error; and
error correcting means arranged to reference said error rate table and perform error correcting of said post-data of said received bit string.

10. An information processing device arranged to create an error rate table employed for error correcting, comprising:
receiving means arranged to receive a signal of test data which is a known transmitted bit string transmitted from a transmission device which transmits a bit string, and outputs a received bit string corresponding to said test data; and
creating means arranged to create said error rate table wherein said received bit string and an error rate of post-data of the received bit string being in error are correlated
by determining an error of the post data which is data of one bit or greater received at the end of the received bit string,
by comparing said received bit string and said test data, and
based on the determination results thereof, finding the error rate wherein said post-data of said received bit string is in error.

11. The information processing device according to claim 10 wherein said transmission device increases the bit length of said test data while repeating transmission of said test data;
wherein said receiving means receives said test data and outputs said received bit string; and
wherein said creating means determines the error of said post-data of said received bit string, and based on the determination results thereof finds the error rate wherein said post-data of said received bit string is in error, repeating this until said received bit string wherein the error rate of said post-data of 1.0 no longer changes;
whereby said error rate table wherein said received bit string as to the test data of the bit length when said received bit string with said post-data error rate of 1.0 no longer changes, and said error rate, are correlated.

12. The information processing device according to claim 10 wherein said creating means create said error rate table with said received bit string, the error rate of said post-data that is in error of said received bit string, and the correct values of said post-data in error, being correlated.

13. The information processing device according to claim 10 wherein said creating means creates said error rate table with said received bit string and the error rate of the last one received bit of said received bit string serving as said post data in error, being correlated.

14. The information processing device according to claim 10 wherein said creating means creates said error rate table with said received bit string, the error rate of a plurality of bits received at the end of said received bit string as said post-data in error, and the correct values of the plurality of bits, being correlated.

15. An information processing method for an information processing device arranged to create an error rate table employed for error correcting, comprising the steps of:
receiving a signal of test data which is a known transmitted bit string transmitted from a transmission device which transmits a bit string, and outputting a received bit string corresponding to said test data; and
creating said error rate table wherein said received bit string and an error rate of said post-data that is in error of the received bit string are correlated
by determining the error of the post data which is data of one bit or greater received at the end of the received bit string, by comparing said received bit string and said test data, and based on the determination results thereof, finding the error rate wherein said post-data of said received bit string is in error.

16. A non-transitory computer readable medium having instructions that when executed causes a computer to function as an information processing device arranged to create an error rate table employed for error correcting, comprising:

receiving means arranged to receive a signal of test data which is a known transmitted bit string transmitted from a transmission device which transmits a bit string, and outputs a received bit string corresponding to said test data; and creating means arranged to create said error rate table wherein said received bit string and an error rate of said post-data that is in error of the received bit string are correlated by determining the error of the post data which is data of one bit or greater received at the end of the received bit string, by comparing said received bit string and said test data, and based on the determination results thereof, finding the error rate wherein said post-data of said received bit string is in error.

17. A reception device configured to receive a signal of a transmitted bit string transmitted from a transmission device which transmits a bit string, comprising:

a reception unit arranged to receive the signal from said transmission device and output a received bit string corresponding to said transmitted bit string;

a storing unit arranged to store an error rate table wherein said received bit string is correlated with an error rate of post-data which is data of one bit or greater received following the received bit string being in error; and an error correcting unit arranged to perform error correcting of said post-data of said received bit string.

18. A non-transitory computer readable medium having instructions that when executed causes a computer to function as a reception device arranged to receive a signal of a transmitted bit string transmitted from a transmission device which transmits a bit string, comprising:

a reception unit arranged to receive the signal from said transmission device and output a received bit string corresponding to said transmitted bit string;

a storing unit arranged to store an error rate table wherein said received bit string is correlated with an error rate of post-data which is data of one bit or greater received following the received bit string being in error; and an error correcting unit arranged to reference said error rate table and perform error correcting of said post-data of said received bit string.

19. An information processing device arranged to create an error rate table employed for error correcting, comprising:

a reception unit arranged to receive a signal of test data which is a known transmitted bit string transmitted from a transmission device which transmits a bit string, and outputs a received bit string corresponding to said test data; and a creating unit arranged to create said error rate table wherein said received bit string and an error rate of said post-data of the received bit string being in error are correlated by determining the error of the post data which is data of one bit or greater received at the end of the received bit string, by comparing said received bit string and said test data, and based on the determination results thereof, finding the error rate wherein said post-data of said received bit string is in error.

20. A non-transitory computer readable medium having instructions that when executed causes a computer to function as an information processing device arranged to create an error rate table employed for error correcting, comprising:

a reception unit arranged to receive a signal of test data which is a known transmitted bit string transmitted from a transmission device which transmits a bit string, and outputs a received bit string corresponding to said test data; and a creating unit arranged to create said error rate table wherein said received bit string and an error rate of said post-data of the received bit string being in error are correlated by determining the error of the post data which is data of one bit or greater received at the end of the received bit string, by comparing said received bit string and said test data, and based on the determination results thereof, finding the error rate wherein said post-data of said received bit string is in error.

* * * * *